United States Patent [19]

Matsumoto et al.

[11] Patent Number: 5,557,590
[45] Date of Patent: Sep. 17, 1996

[54] AUTO CHANGER CAPABLE OF RECORDING/REPRODUCING INFORMATION SIGNALS ON A SELECTIVE DISC-SHAPED RECORDING MEDIUM

[75] Inventors: Shuichi Matsumoto; Akira Shinada, both of Kanagawa; Tetsuya Shiroishi, Chiba, all of Japan

[73] Assignee: Sony Corporation, Tokyo, Japan

[21] Appl. No.: 251,131

[22] Filed: May 31, 1994

[30] Foreign Application Priority Data

May 31, 1993 [JP] Japan .................................. 5-152900
May 31, 1993 [JP] Japan .................................. 5-152902

[51] Int. Cl.⁶ .............................................. G11B 17/22
[52] U.S. Cl. ................................ 369/30; 369/32; 369/37
[58] Field of Search .................................. 369/30, 32, 13, 369/178, 180, 197, 34, 36, 37, 38, 39, 41; 345/86, 87, 90, 116

[56] References Cited

U.S. PATENT DOCUMENTS

| | | | |
|---|---|---|---|
| 4,755,978 | 7/1988 | Takizawa et al. | 369/37 |
| 5,025,431 | 6/1991 | Naito | 369/36 |
| 5,105,412 | 4/1992 | Yoshio | 369/33 |
| 5,115,419 | 5/1992 | Akiyama et al. | 369/37 |
| 5,228,021 | 7/1993 | Sato et al. | 369/32 |
| 5,235,568 | 8/1993 | Masaru | 369/2 |
| 5,274,516 | 12/1993 | Kakuta et al. | 369/85 |
| 5,392,264 | 2/1995 | Hira | 369/32 |
| 5,412,628 | 5/1995 | Yamazaki et al. | 369/32 |
| 5,446,714 | 8/1995 | Yoshio et al. | 369/32 |
| 5,467,326 | 11/1995 | Miyashita et al. | 369/30 |

FOREIGN PATENT DOCUMENTS

| | | |
|---|---|---|
| 356995 | 3/1990 | European Pat. Off. . |
| 453064 | 3/1990 | European Pat. Off. . |
| 464482 | 1/1992 | European Pat. Off. . |
| 504562 | 9/1992 | European Pat. Off. . |
| 589479 | 3/1994 | European Pat. Off. ............. 369/178 |
| 6195838 | 7/1994 | Japan ................................ 369/178 |
| 2062935 | 5/1981 | United Kingdom . |
| 2243481 | 10/1991 | United Kingdom . |

OTHER PUBLICATIONS

Patent Abstracts of Japan, vol. 12, No. 187, May 31, 1988 (Hayakawa) JP 5-016,735.
Patent Abstracts of Japan, vol. 17, 288, Jun. 3, 1993 (Fujimoto) JP-2-291,300.

*Primary Examiner*—Tan Dinh
*Attorney, Agent, or Firm*—Jay H. Maioli

[57] ABSTRACT

An apparatus for recording and/or reproducing a disc-shaped recording medium records and/or reproduces information signals on or from the recording medium having an information recording region for recording information signals and a table-of-contents region for recording at least the number data and the title data of the information signals recorded in the information recording region. The recording and/or reproducing apparatus includes a recording and/or reproducing unit and a display unit. Within the recording and/or reproducing unit, a plurality of disc-shaped recording media are disposed and arranged co-planarly in a side-by-side relation to one another. The recording and/or reproducing unit records the information signals on a selected one of the disc-shaped recording media and/or reproduces the information signals from the selected disc-shaped recording medium. The display unit, which has its control operation controlled by an output signal from an output signal of the recording and/or reproducing unit, has a first display region for displaying data recorded in the table-of-contents region and a second display region having a display configuration corresponding to the arrangements of the disc-shaped recording media. The second display region is simultaneously employed as a display area for indicating the audio sound hearing position controlled by a sound field controller.

26 Claims, 14 Drawing Sheets

| | | | | | |
|---|---|---|---|---|---|
| 1. | △ | △ | △ | △ | △ |
| 2. | ○ | ○ | ○ | ○ | ○ |
| 3. | × | × | × | × | × |
| 4. | □ | □ | □ | □ | □ |
| 5. | ◇ | ◇ | ◇ | ◇ | ◇ |
| 6. | ☆ | ☆ | ☆ | ☆ | ☆ |

```
1.  △ △ △ △      6.  ○ ○ ○ ○
2.  ○ ○ ○ ○      7.  □ □ □ □
3.  × × × ×      8.  △ △ △ △
4.  □ □ □ □      9.  ◇ ◇ ◇ ◇
5.  ◇ ◇ ◇ ◇     10. × × × ×
```

AUTO CHANGER CAPABLE OF RECORDING/REPRODUCING INFORMATION SIGNALS ON A SELECTIVE DISC-SHAPED RECORDING MEDIUM

BACKGROUND

1. Field of the Invention

This invention relates to a recording and/or reproducing apparatus for a disc-shaped recording medium. More particularly, it relates to a recording and/or reproducing apparatus for a disc-shaped recording medium, and a sound reproducing apparatus, in which information signals may be recorded on or reproduced from one of a plurality of disc-shaped recording media.

2. Background of the Invention

Recently, optical disc reproducing apparatus have become popular in addition to cassette decks or tuners, for automobile sound reproducing systems and are being diversified in their functions. The optical disc reproducing apparatus includes a magazine capable of containing multiple optical discs. A disc reproducing apparatus having a so-called disc exchange function, that is, capable of selectively reproducing the optical discs contained in the magazine, referred to hereinafter simply as a changer, has become predominant.

As an example, a magazine 201 of such changer, capable of containing six optical discs D therein, as shown in FIG. 1, is configured to accommodate six optical discs D so that the planar surfaces of the discs D lie horizontally with a vertical clearance from one another. The discs D are termed the first, second, and so forth, up to the sixth as counted from the bottom to the top of the magazine 201.

The changer includes an operating panel for effecting a variety of operations, such as the playback operation or the optical disc selecting operation, and a display unit for listing the number or the title of the discs D contained in the changer. The list display configuration is shown in FIG. 2, in which the discs D are indicated as "1", "2", ... "6" as counted from the top to the bottom, thus in the reverse order to the arraying order of the discs D in the magazine, and the title of the optical disc bearing the associated number is also displayed.

In a changer capable of containing ten optical discs, the display is made in five rows in two columns, owing to the constraint in the display area of the display unit, as shown in FIG. 3. The left column is numbered 1 to 5, while the right column is numbered 6 to 10, and the title of the optical disc bearing the disc number is also displayed.

Recently, the number of the optical disc being reproduced is displayed in a unique color, or the number and the title of the disc is displayed with brightness inversion.

FIG. 4 shows another conventional display configuration for the display unit, according to which a number of marks M corresponding to the number of the optical discs D loaded in the changer magazine are displayed in a single transverse row at an upper portion of the display area. In addition, serial numbers are affixed to the marks so that the number of the loaded discs can be grasped easily.

If four optical discs D, instead of the six, are loaded in the magazine 201, the numbers of the marks for the discs not loaded in the magazine remain unlighted so that the state of loading of the discs in the magazine 201 can be grasped easily.

With the listing display configuration on the display unit of the conventional changer, the arraying order of the optical discs D in the magazine 201 shown in FIG. 1 does not correspond to the list display sequence shown in FIG. 2. Consequently, when a given optical disc D loaded in the magazine 201 is exchanged for another optical disc, the arraying sequence in the magazine 201 is different from the list display sequence on the display unit. Consequently, in effecting the disc exchange, the list display sequence needs to be checked in association with the arraying sequence in the magazine 201 by a laborious operation.

Meanwhile, the optical disc D to be displayed is directly selected using a ten-key selection area provided on the operating panel. However, when the user is driving a car, it is occasionally difficult to reach his or her hand to the operating panel for performing the selecting operation for the optical discs. Consequently, a remote control switch, for example, is used for performing the disc selecting operation.

The conventional switch of this kind is mainly of a joystick type in which a cursor is moved by a lever operation or of a push-button type provided with buttons having printed marks of $\Delta$ or $\nabla$ on their surfaces.

An output signal from this switch is fed to a disc selecting mechanism selecting one of the optical discs D loaded in the magazine 201 and transferring it to the reproducing unit. When selecting the fourth disc D as counted from the first disc D, the lever is pushed upwards or the button having the printed mark $\Delta$ is actuated, that is, the disc selecting operation is performed in the upward direction. However, the cursor indicating the direction of the selective operation is moved downwards, thus performing a movement opposite to the manual operating direction. The result is that the optical disc selecting operation is difficult to grasp and susceptible to a mistaken operation, while a lot of time is consumed until the user becomes accustomed to the sequence of the disc selecting operations.

The display configuration of the marks M on the display unit shown in FIG. 4 is not coincident with the array configuration of the optical discs D loaded in the changer magazine 201. For example, in the magazine 201 capable of containing six vertically stacked optical discs D, as shown in FIG. 1, the display configuration in the display region of the display plate is a horizontal array of a number of marks M corresponding to the number of the optical discs D loaded in the changer, as shown in FIG. 4. In such case, only the fourth optical disc D has a number coincident with the number of the mark M bearing the number "4". Consequently, the disc number of the optical discs D being reproduced can only be grasped based upon the number represented in the character shown on the mark M so that the optical disc being reproduced cannot be identified intuitively.

Although no impediments are raised when the changer is used in a chamber or the like, the changer operation becomes extremely troublesome if the user is driving a car and yet has to check the disc number of the optical disc D being reproduced by consulting the display plate. The result is that the changer is used less frequently and the consuming public feels less inclined to purchase the car-laden changer.

Moreover, in an audio reproducing apparatus, inclusive of the changer, mounted in a car compartment is designed so that a wide acoustic space is created in the narrow car compartment and a sound field processor is also included for improving the fixed position sense of the sound image by adjusting the sound balance outputted from the four speakers and the phase delay of the audio output.

In particular, the sound field processor is designed so that the fixed position sense of the sound image, as improved by the adjustment of the sound volume balance from the four speakers and the phase delay of the sound output, is located at the mid position of each of the four seats within the car compartment. However, at the current technical level, the user only has to select the hearing position (seat position) with the view to improve the fixed sound sense at the selected seat position. In this manner, the audio outputs from the four speakers can be adjusted in response to the selected seat position.

In such case, selection of the seat position is achieved by operating a selector e.g. a number key on the operating panel. There is no direct correlation between the seat position and the number and hence the actual practice is that the operator learns the number corresponding to the seat position by heart and accordingly performs the operation.

Consequently, for the operation of the sound field processor, the seat position to which the sound position is desired to be located cannot be known intuitively. In addition, the seat position which is the subject of the current sound field control cannot be known intuitively. As a result, the operation of the sound field processor becomes laborious.

In order to overcome such problems, it may be thought to make a display simulating the seat array in the car by arraying the seat-simulating marks, referred to herein as seat marks, in two rows by two columns, and to set the seat positions based upon the seat mark display in two rows by two columns. However, since the car-laden audio device is mounted within a narrow car space, limitations are imposed on the size of the operating panel. Also, the display region of the display unit provided in the operating panel is designed with a small size in proportion to the operating panel.

Consequently, it is physically impossible to display useful multiple marks indicating the number and title of the optical discs and the loading states of the optical discs D used for the changer operation and the four seat marks in two rows by two columns used for the sound field processor within a narrow display region of the display section, for even if these marks were displayed in the display region, the display size would be too small to be viewed easily.

SUMMARY OF THE INVENTION

It is therefore an object of the present invention to provide a recording and/or reproducing apparatus for a disc-shaped recording medium which resolves the above-mentioned problems.

According to the present invention, there is provided a recording and/or reproducing apparatus for a disc-shape recording medium having a recording region for recording information signals and a table-of-contents region for recording numbers or titles of the information signals recorded in the recording region. The apparatus includes a recording and/or reproducing unit and a display unit. In the recording and/or reproducing unit, multiple disc-shaped recording media are loaded and arrayed in the same plane in a side-by-side relation to one another. Recording and/or reproduction of the information signals is made on or from the selected recording medium. The display unit has its display operation controlled by an output signal of the recording and/or reproducing unit. The display unit comprises a first display region for displaying data recorded in the table-of-contents region and a second display region having the same display configuration as the arraying status of the multiple disc-shaped recording media.

In one aspect of the present invention, the apparatus also comprises an input unit for inputting a signal for selecting a pre-set one of the recording media contained in the recording and/or reproducing unit. In the first and second display regions, display is made based upon the output signal from the recording and/or reproducing unit or an output signal of the recording and/or reproducing unit following the selecting operation of the pre-set disc-shaped recording medium based upon the input signal from the input unit.

In another aspect of the present invention, the display configuration of the first display region is the matrix display associated with the display configuration of the second display region.

According to the present invention, there is also provided an audio reproducing apparatus comprising a device for recording and/or reproducing a disc-shaped recording medium, a plurality of speakers, and a sound field processor. The recording and/or reproducing device includes a recording and/or reproducing unit and a display unit. The recording and/or reproducing unit contains a plurality of disc-shaped recording media which are arranged co-planarly in a side-by-side relation. The recording and/or reproducing unit records the information signals on a selected one of the disc-shaped recording media and/or reproduces the information signals from the selected disc-shaped recording medium. The display unit has its display operation controlled by an output signal from the recording and/or reproducing unit. The display unit has a first display region for displaying data recorded in the table-of-contents region and a second display region having the same display configuration as the multiple disc-shaped recording media. The speakers are fed with an output signal of the recording and/or reproducing unit and output the audio signal. The sound field controller matches the fixed position sense of a sound image corresponding to the audio output of the speakers to a selected audio sound hearing position. The audio sound hearing position controlled by the sound field controller is displayed on the display unit using the second display region. According to the present invention, the second display region is provided in the display unit in addition to the first display region displaying the number and the title of the optical discs. By viewing the display state of the second display region, that is, the display state associated with the array of the disc-shaped recording media, the user is at a position to grasp intuitively how the disc-shaped recording media are arranged in the recording and/or reproducing unit. In addition, by viewing the second display region, the user is at a position to grasp intuitively which recording medium or which number recording medium is being recorded or reproduced.

In addition, by viewing the second display region, displaying the arraying states of the sound hearing position as set by the sound field controller, the user is in a position to grasp easily the actual sound hearing position. Since the arraying state of the sound hearing position is displayed using the second display region, the necessity of providing a separate display unit is eliminated to render it possible to make effective utilization of the display region.

BRIEF DESCRIPTION OF THE DRAWINGS

FIGS. 5a and 5b illustrate a recording and/or reproducing apparatus for a disc-shaped recording medium according to the present invention, wherein FIG. 5a is a perspective view showing a schematic arrangement of the recording and/or reproducing apparatus for a disc-shaped recording medium and FIG. 5b shows the disc cartridge arraying state in a magazine employed in the apparatus shown in FIG. 5a.

FIGS. 10a and 10b illustrate a recording and/or reproducing apparatus for a disc-shaped recording medium according to the present invention, wherein FIG. 10a is a perspective view showing a schematic arrangement of the recording and/or reproducing apparatus for the disc-shaped recording medium and FIG. 10b shows the disc cartridge arraying state in the magazine employed in the apparatus shown in FIG. 10a.

FIGS. 13a to 13d illustrate list display configurations on the display unit of the optical disc reproducing apparatus according to the second embodiment of the present invention, wherein FIG. 13a shows the display format when a disc cartridge associated with the arraying number "1" of the disc cartridges in the magazine is selected, FIG. 13b shows the display format when a disc cartridge associated with the arraying number "2" of the disc cartridges in the magazine is selected, FIG. 13c shows the display format when a disc cartridge associated with the arraying number "3" of the disc cartridges in the magazine is selected and FIG. 13d shows the display format when a disc cartridge associated with the arraying number "4" of the disc cartridges in the magazine is selected.

DESCRIPTION OF THE INVENTION

Referring to FIGS. 5a and 5b to FIG. 9, a disc recording and/or reproducing apparatus for a disc-shaped recording medium according to a first embodiment of the present invention is explained. However, beforehand, the schematic arrangement of a car-laden audio equipment, to which is applied the recording and/or reproducing apparatus for the disc-shaped recording medium according to the present invention, is explained.

The car-laden audio system, to which is applied the recording and/or reproducing apparatus for the disc-shaped recording medium according to the present invention, includes a magazine for containing multiple disc cartridges, each containing an optical disc, such as a replay-only optical disc or a write type magneto-optical disc, rotatably therein. Within the magazine, multiple disc cartridges are contained in the horizontal position. The car-laden audio apparatus includes an optical disc reproducing unit for selectively reproducing information signals from the optical disc of one of the disc cartridges and outputting the reproduced audio information signals via four speakers, and a sound field processor for creating an acoustic field in a narrow car space by controlling the reverberating sound and for improving the fixed sound image by the output sound volume balance from the four speakers and adjustment of the phase delay of the audio output.

Figures 1, 2:
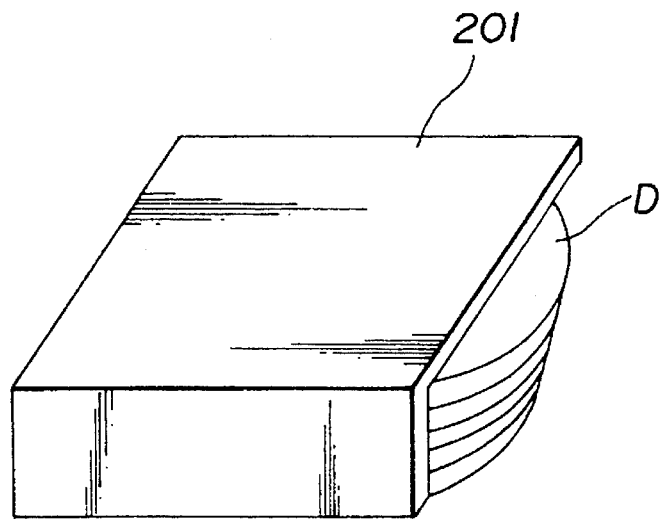
FIG. 1 is a perspective view showing the arrangement of a magazine employed in a disc reproducing apparatus having a conventional disc exchange function.
FIG. 2 shows an illustrative display format of a display unit of a disc reproducing apparatus having a conventional disc exchange function.
Figures 3, 4:
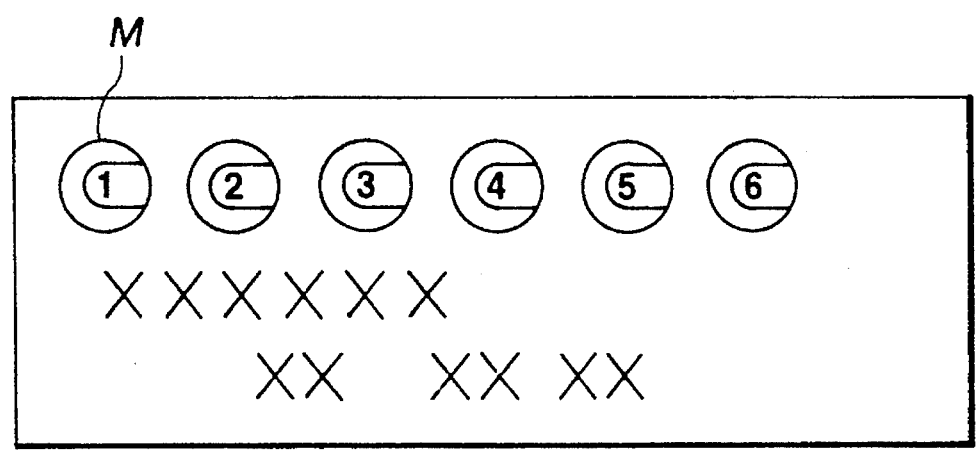
FIG. 3 shows another illustrative display format of a display unit of a disc reproducing apparatus having a conventional disc exchange function.
FIG. 4 shows still another illustrative display format of a display unit of a disc reproducing apparatus having a conventional disc exchange function.
Figures 5A, 5B:
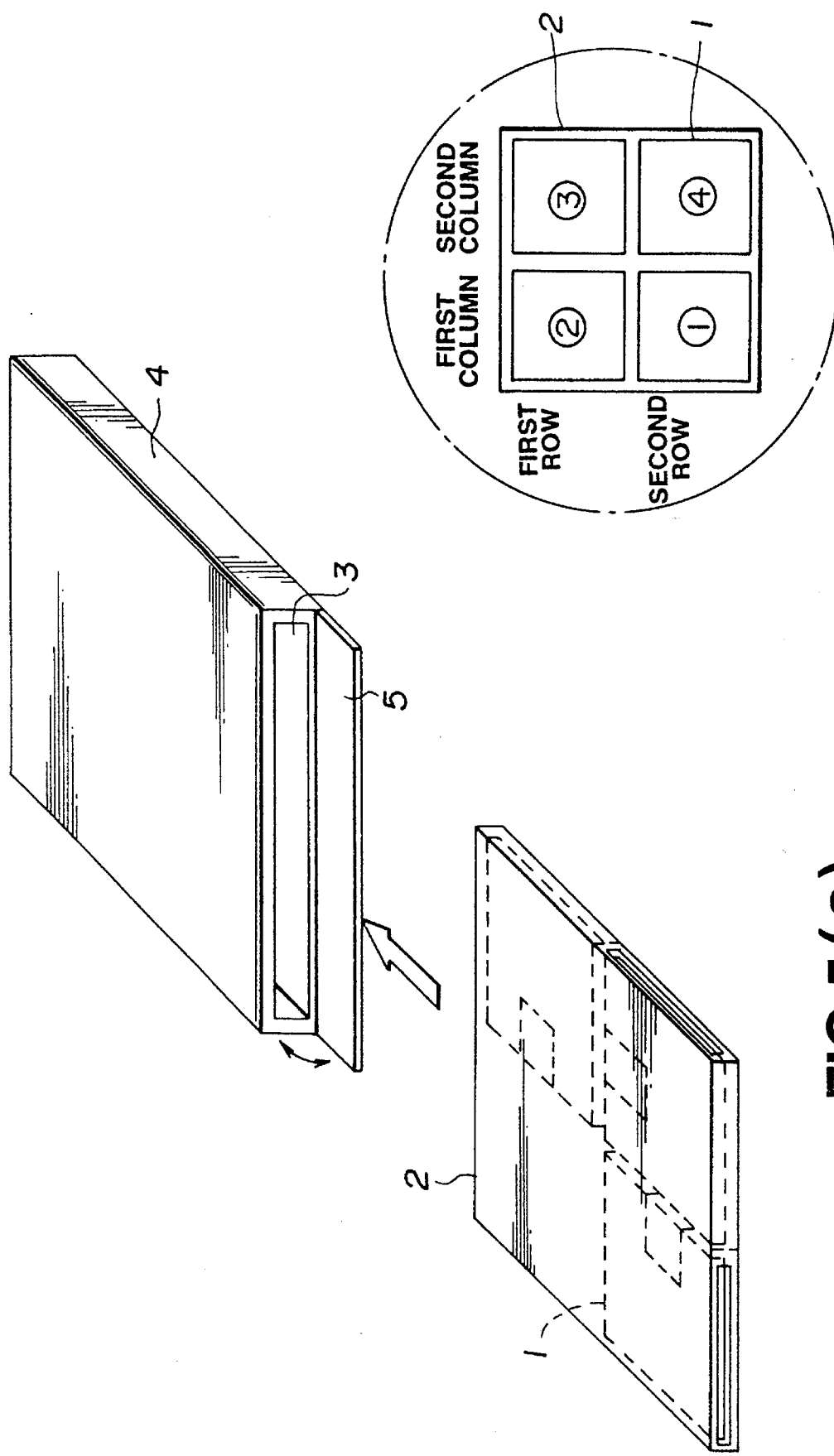

The optical disc reproducing apparatus includes a main member of the reproducing apparatus 4 and an operating panel 5, as shown in FIG. 5a. Into the main member of the reproducing apparatus 4 is inserted via an entrance/exit opening 3 a magazine 2 in which four disc cartridges 1 at the maximum are loaded in a planar array of two rows by two columns. The operating panel 5 is mounted for opening/closing movement with respect to the entrance/exit opening 3 by a hinge, not shown, on the front surface of the main member of the reproducing apparatus 4. The optical disc contained in the disc cartridge 1 has recorded thereon table-of-contents data (TOC data) used for retrieving the title of the information signals or music signals recorded in the recording region, the title of the optical disc and so-called album title.

Within the main member of the reproducing apparatus 4 is mounted a rotary table for rotation with respect to a chassis. On the upper surface of the rotary table, there are mounted a spindle motor and an optical pickup, both of which are halted at pre-set positions (home positions) as a result of initial rotation of the rotary table on power on of the main member of the reproducing apparatus 4. When the magazine 2 having multiple disc cartridges 1 loaded thereon is introduced via the entrance/exit opening 3 into the main member of the reproducing apparatus 4, the spindle motor and the optical pickup are positioned in register with the disc cartridge 1 loaded at the second row of the first column, that is, at a position indicated by the array number "1" in FIG. 5b. When the shutter mounted on this disc cartridge 1 is opened, the spindle motor and the optical pickup are positioned in register with an exposed portion of the optical disc enclosed within the disc cartridge 1.

On the upper end of the spindle motor is mounted a turntable on which is loaded an optical disc of the selected disc cartridge 1. The optical pickup is made up of a laser light source for radiating a laser beam for reading out information signals recorded on the optical disc, an objective lens for converging the laser beam from the laser light source on the recording surface of the optical disc, and a photodetector for photoelectrically converting the light reflected by the recording surface of the optical disc into electrical detection signals. The objective lens is driven by an actuator, not shown, in the focusing direction and in the tracking direction based upon focusing error signals and tracking error signals.

The optical pickup is driven radially with respect to the optical disc loaded on the turntable by a linear motor feed mechanism.

Figure 6:
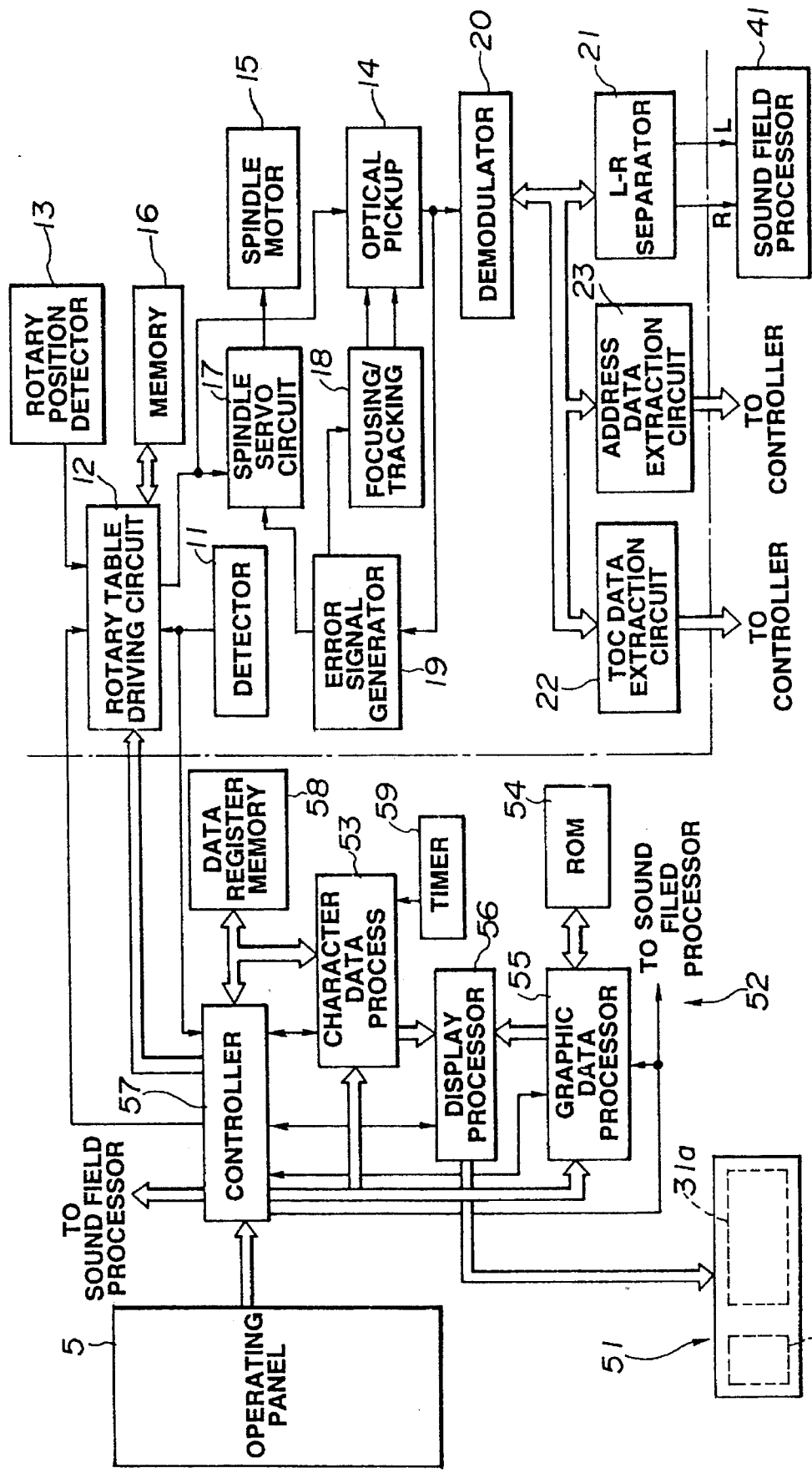
FIG. 6 is block diagram showing an arrangement of an optical disc reproducing apparatus as the recording and/or reproducing apparatus for the disc-shaped recording medium according to a first embodiment of the present invention.

The reproducing circuitry of the main member of the reproducing apparatus 4 is explained by referring to FIG. 6. The reproducing circuitry includes a cartridge detector 11 for optically detecting the disc cartridge 1 loaded on the magazine 2 introduced into the main member of the reproducing apparatus 4, a rotary table driving circuit 12 for rotationally driving the rotary table in one direction, and a rotary position detector 13 for detecting the rotary position or the angle of rotation of the rotary table. The rotary table driving circuit 12 first runs the rotary table in rotation, based upon reception on power-on of a start signal from a controller 57 in the display unit, as later explained, to halt the optical pickup 14 and the spindle motor 15 at the home position, that is, at a position registering with the disc cartridge 1 loaded on the second row of the first column in FIG. 5b.

The detection signal from the cartridge detector 11 is supplied to the controller as later explained. The controller formulates the flag information, based upon the detection signal supplied thereto, and stores the flag information in a data register memory as later explained. The detection signal from the cartridge detector 11 is also supplied to a rotary table driving circuit 12. The rotary table driving circuit 12 stores the detection signal supplied thereto in order to control the driving rotation of the rotary table based upon the contents of the detection signal. That is, the rotary table driving circuit 12 runs the rotary table in rotation as it causes the spindle motor 15 and the optical pickup 14 to be moved so that these are not positioned in register with the portions of the magazine not carrying the disc cartridge 1.

The rotary table driving circuit 12 rotates the rotary table in one direction based upon the number data from the controller as later explained for halting the optical pickup 14 and the spindle motor 15 at the position registering with the disc cartridge 1 corresponding to the number data. For controlling the rotation of the rotary table in a rotary table driving circuit 12, it is possible to read out the rotational angle data corresponding to the input number data from a rotational angle data table in a memory 16, count the number of rotational clock signals supplied in succession from the rotational position detection circuit 13 and to halt the rotational table when the count value coincides with the read-out rotational angle data.

The reproducing circuitry also includes a spindle servo circuit 17, a focusing/tracking servo circuit 18, an error signal generating circuit 19, a demodulating circuit 20, a L-R separating circuit 21, a TOC data extracting circuit 22 and an address data extracting circuit 23. The spindle servo circuit 17 servo-controls the spindle motor 16 so that the optical disc is run in rotation at a constant linear velocity. The focusing/tracking servo circuit 18 controls the actuator of the optical pickup 14 for focusing control and tracking control of the objective lens. The error signal generating circuit 19 generates spindle servo error signals, focusing servo error signals and tracking servo error signals based upon detection signals from the optical pickup 14. The demodulating circuit 20 converts the detection signals from the optical pickup 14 to digital signals and decodes code data appended for error correction in order to output the resulting signals as playback data. The L-R separating circuit 21 converts the playback data from the demodulating circuit 20 to analog signals and separates them into left channel signals and right channel signals which are output as left side audio signals and right side audio signals, respectively. The TOC data extracting circuit 22 extracts TOC data from the playback data from the demodulating circuit 20. The address data extracting circuit 23 extracts track address data from the playback data from the demodulating circuit 20.

The TOC data from the TOC data extracting circuit 22 is stored in a TOC data file logically apportioned in a data register memory through a controller as later explained.

When the rotary table driving circuit 12 has rotated the rotary table in one direction and has halted the optical pickup 14 and the spindle motor 15 at a position registering with the disc cartridge 1 corresponding to the input number data, it issues a start signal to a vertical movement mechanism, not shown, designed for producing the vertical movement of the spindle motor 15. The vertical movement mechanism causes the spindle motor 15 to be moved upwards, for example, responsive to the start signal from the rotary table driving circuit 12, for loading the optical disc on the turntable of the spindle motor.

The start signal from the rotary table driving circuit 12 is also supplied to the spindle servo circuit 17 and to the optical pickup 14. The spindle servo circuit 17 drives the spindle motor 15 in response to the start signal from the rotary table driving circuit 12 and to the end of loading of the optical disc on the turntable. As a result the optical disc loaded on the turntable is rotated with, for example, a constant linear velocity (CLV). The optical pickup 14 is started in response to the start signal from the rotary table driving circuit 12 and moved radially with respect to the optical disc, as it radiates the laser beam on the recording surface of the optical disc, for sequentially reading out the information signals recorded on the recording surface of the optical disc.

The right side audio signals and the left side audio signals, output from the L-R separating circuit 21, are supplied to a sound field processor 41 as later explained.

Figure 7:
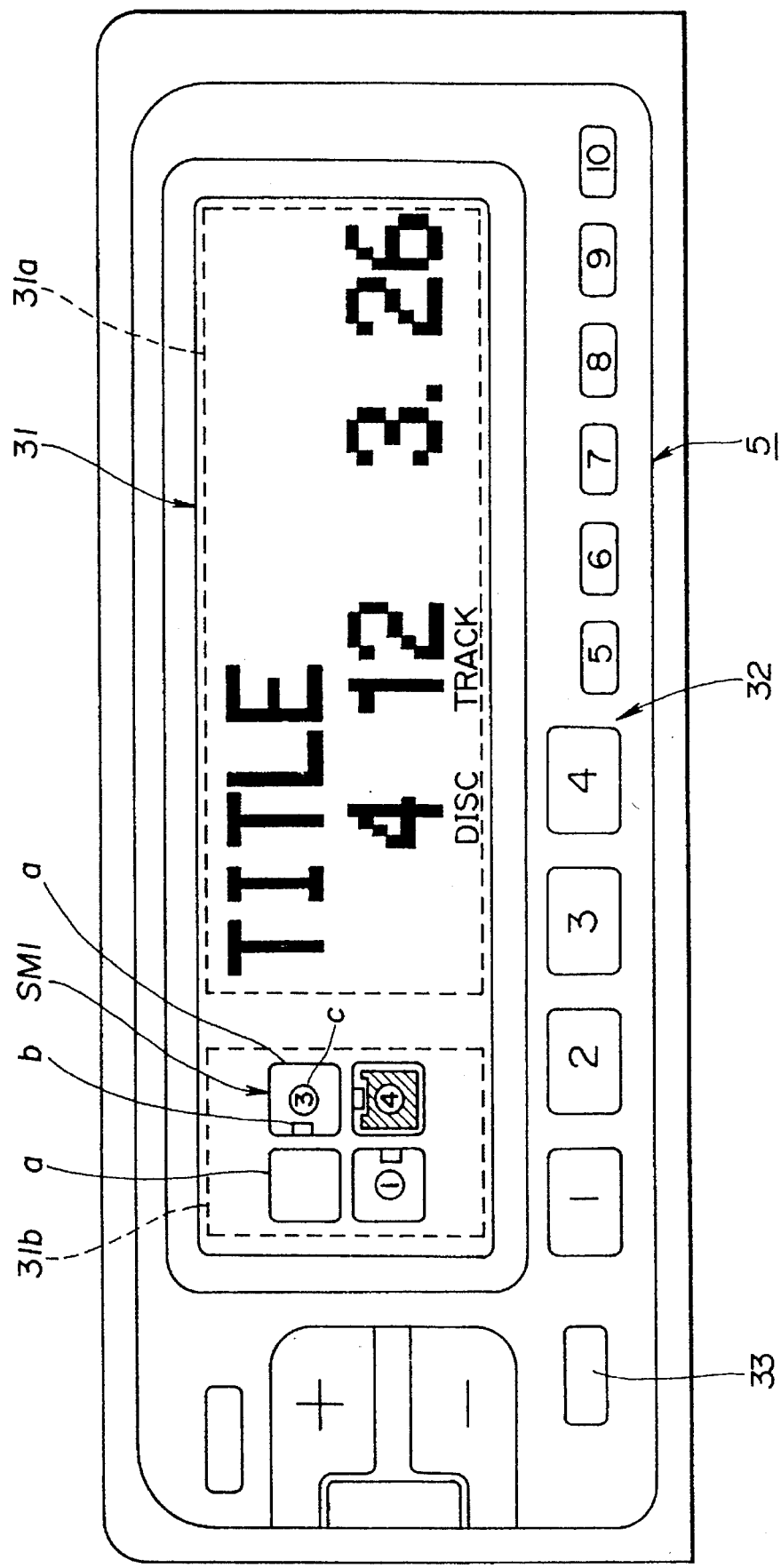
FIG. 7 illustrates the list display format on the display unit of the optical disc reproducing apparatus according to the first embodiment in a mode other than the sound field control mode.

The operating panel 5 has a display surface 31 at a mid part on its front surface and a transverse array of a ten-key selection area 32 at a lower portion with respect to the display surface 31, as shown in FIG. 7. A selector button 33 for starting the sound field processor is arranged on the left-hand side of the a ten-key selection area 32.

Figure 9:
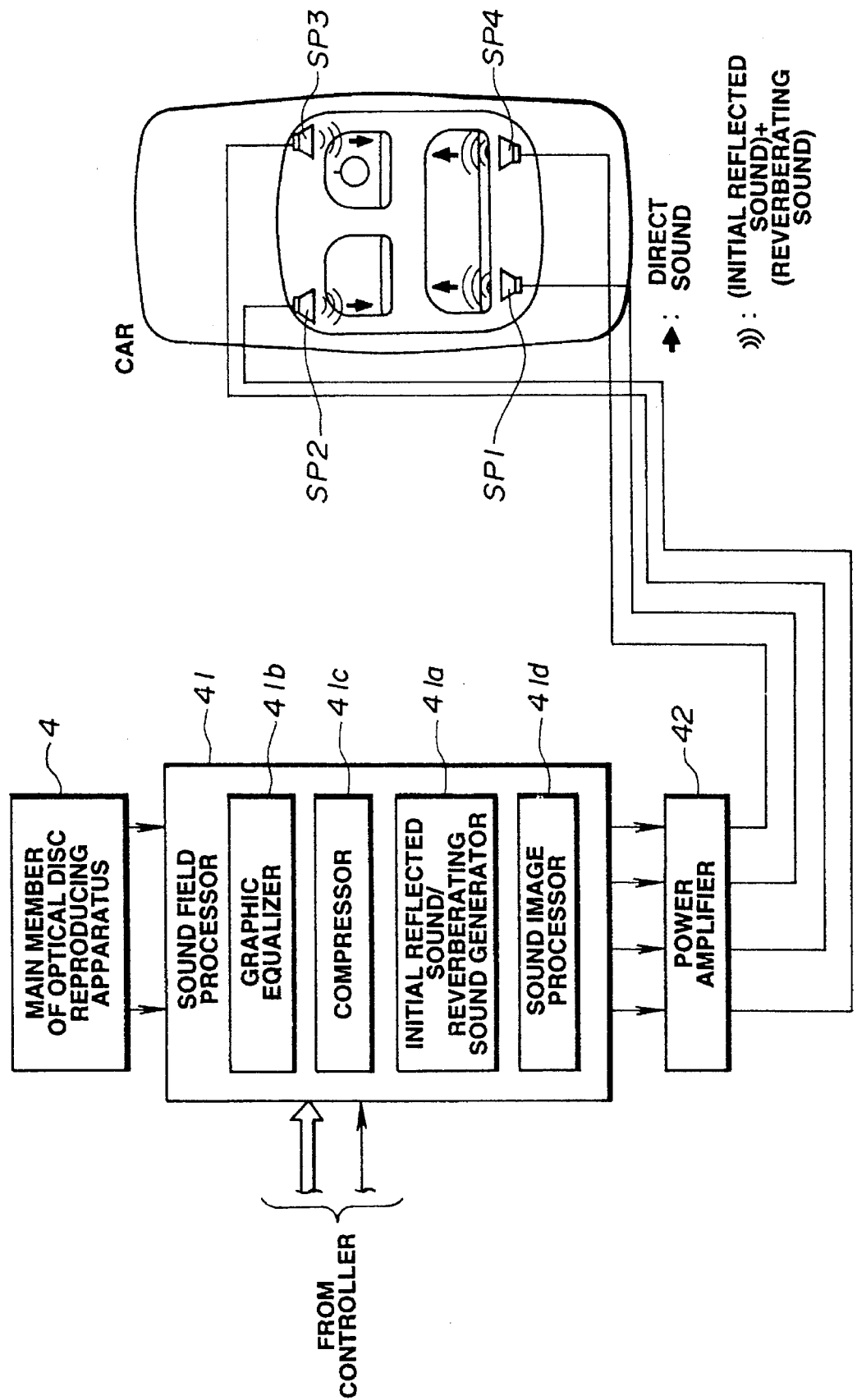
FIG. 9 is a block diagram showing an arrangement of a sound field processor.

The sound field processor 41 is arranged between the main member of the reproducing apparatus 4 and a four-fold power amplifier 42 connected to four speakers SP1 to SP4 arranged at the four corners in the car compartment as shown in FIG. 9. The sound field processor 41 includes an initial reflected sound/reverberating sound generator 41a, a graphic equalizer 41b, a compressor 41c and a sound image processor 41d. The initial reflected sound/reverberating sound generator 41a generates the initial reflected sound and the reverberating sound based on the data of the sound field, such as a music hall. The graphic equalizer 41b corrects the frequency response and transmission characteristics of the speakers. The compressor 41c is used for improving the S/N ratio by reducing the dynamic range. The sound image processor 41d is used for improving the fixed position sense of the sound image by adjusting the phase delay of the audio output and the sound volume balance of the audio sound output from the 4-channel speakers SP1 to SP4 in connection with seat positions associated with the seat numbers as selected by the operating panel 5.

The display device according to the first embodiment is made up of a display unit 51, inclusive of a display screen 31 arranged on the operating panel 5, and a display processing circuitry 52 for generating display data for making a screen display by means of the display unit 51, as shown in FIG. 6.

Figure 8:
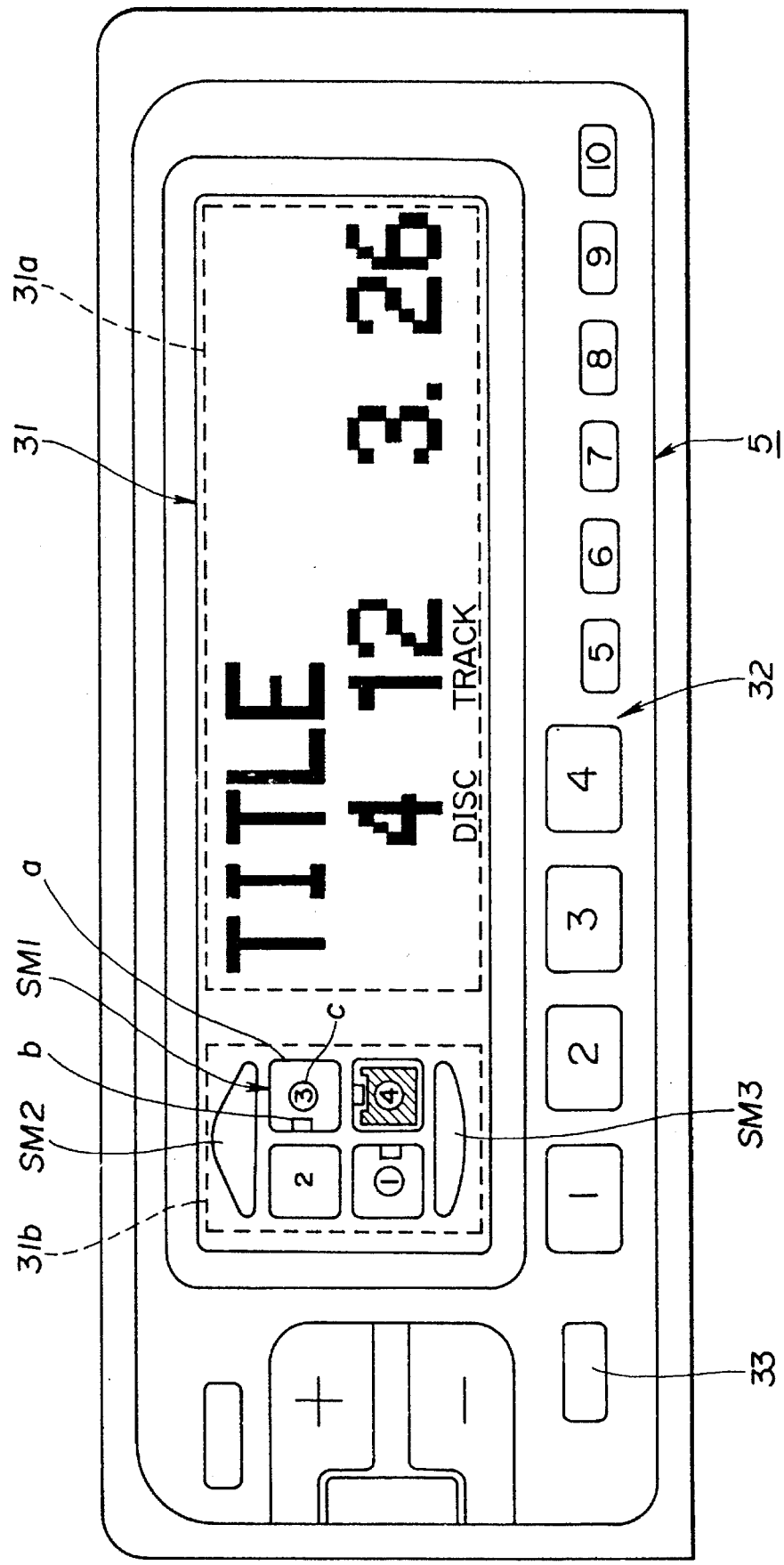
FIG. 8 illustrates the list display format on the display unit of the optical disc reproducing apparatus according to the first embodiment in the sound field control mode.

The display unit 51 includes a liquid crystal display, for example, which has its display screen 31 divided into two display regions 31a and 31b. The display region 31a is a character display region for displaying letters, figures and so forth. The other display region 31b is a graphic display region for displaying a symbol mark simulating the outer shape of the disc cartridge 1, termed a cartridge symbol SM1, as shown in FIG. 7, a symbol mark simulating the dashboard within the car compartment, termed a dashboard symbol SM2 and a symbol mark simulating the shelf at back of the rear seat, termed a rear shelf symbol, as shown in FIG. 8. The display region 31b is arranged on the left side part of the display screen 31 of the display unit 51, that is, a portion above the key "1" of the ten-key selection area 32. The background of the display screen is set to a white color hue.

Four of the cartridge symbols SM1 are displayed in correspondence with the number of the disc cartridges 1 loaded in the magazine 2 inserted into the optical disc reproducing apparatus. These four cartridge symbols SM1 are arranged in two rows by two columns in correspondence with the array of the disc cartridges 1 loaded in the magazine 2. That is, the cartridge symbols SM1 are of the symbol configuration corresponding to the arraying format of the disc cartridges 1 loaded in the magazine 2.

When the sound field control mode is not set that is, when the selection button 33 on the operating panel 5 is not actuated, the cartridge symbol SM1 has a symbol configuration consisting of the outer profile a, a simulated shutter of the disc cartridge b and a circle c, as shown in FIG. 7. The array number (see FIG. 5b) of the disc cartridge 1 loaded in the magazine 2 is displayed within the circle c.

The cartridge symbol SM1 for the sections of the magazine 2 not loaded with the disc cartridge 1 has only the outer profile a. In the present embodiment the cartridge symbol SM1 for the array number "2" shown in FIG. 5b has such configuration.

On the other hand, if the sound field control mode is set, that is, if the selection button 33 on the operating panel 33 is actuated, a dashboard symbol SM2 is displayed on top of the group of the cartridge symbols SM1 arrayed in two rows by two columns, while a rear shelf symbol SM3 is displayed below the group of the cartridge symbols SM1, as shown in FIG. 8. At this time, the arraying numbers are entered in all of the circles of the cartridge symbols SM1.

With the present display device, part of the cartridge symbol SM1 associated with the optical disc being displayed is displayed in color. That is, the area in the outer profile a exclusive of the inside of the circle c and the inside of the shutter symbol b, indicated by hatching, is displayed in a blue color hue.

The display processing circuitry 52 of the display device according to the first embodiment includes a character data processor 53, a ROM 54, a graphic data processor 55, a display processor 56 and the controller 57, as shown in FIG. 6. The character data processor 53 generates character data for the arraying number of the disc cartridge being reproduced, the optical disc title and the track being reproduced, and the playback time. The graphic data processor 55 reads out fixed data concerning the cartridge symbol SM1 registered in the ROM 54, including data concerning the outer profile a, and generates outer profile arraying data from the read-out fixed data. The outer profile arraying data is used for displaying the cartridge symbols in a pre-set arraying configuration, that is, in a configuration of two rows by two columns. The data processor 55 selectively combines data concerning the shutter symbol b, arraying number data or color display data with the outer profile data for generating the graphic data to be displayed in the display region 31b. The display processor 56 synthesizes the graphic data from the graphic data processor 55 and character data from the character data processor 53 in order to display the synthesized data in the display region 31b of the display unit 51. The controller 57 controls the above-mentioned circuits based upon the operation of the various keys provided on the operating panel 5.

The display operation of the audio apparatus, that is, the apparatus of the present first embodiment, is now explained in conjunction with the operation of the optical disc reproducing apparatus and the sound field processor.

When the power of the audio apparatus is turned on, a start signal is supplied from the controller 57 to the rotary table driving circuit 12. The rotary table driving circuit 12 is responsive to the start signal from the controller 57 for rotationally driving the rotary table and halts the optical pickup 14 and the spindle motor 15 at the home position, that is, at a position registering with the optical disc of the disc cartridge loaded at the second row of the first column, indicated by the array number "1" in FIG. 5b.

The disc cartridges 1 are then inserted into the sections of the magazine 2 bearing the arraying numbers 1, 3 and 4, without loading the disc cartridge for the arraying number 2. The magazine 2 here containing three disc cartridges 1 are then introduced via the entrance/exit opening 3 into the main member of the reproducing apparatus 4. The cartridge detector 11 then optically detects the disc cartridge loading state in the magazine 2. A detection signal from the detector 11 is supplied to the controller 57 and to the rotary table driving circuit 12. The controller 57 stores the detection signal from the cartridge detector 11 as the flag information in a data register memory 58. The rotary table driving circuit 12 stores the detection signal from the cartridge detector 11 as the rotation-skipping information.

The controller 57 then reads out the flag information from the data register memory 58 and routes the read-out information to the graphic data processor 55. The graphic data processor 55 formulates graphic data based upon the flag information from the controller 57. The graphic data in this case comprises the outer profile a of the cartridge symbol having the array number "2" and the combination of the outer profile a, the shutter-simulating symbol b and the circle c for each of the cartridge symbols SM1 having the array numbers "1", "3" and "4".

The graphic data is displayed in the display region 31b of the display unit 51 by means of the display processor 56.

The TOC data of the optical disc having the array number "1" is read, responsive to the start signal from the rotary table driving circuit 12. The TOC data thus read out is stored in the address region in the data file of the data register memory 58 associated with the array number "1" under control by the controller 57.

The rotary table driving circuit 12 then causes the rotary table to be rotated in order to shift the spindle motor 15 and the optical pickup 14 to a position registering with the disc cartridge 1 having the array number "3" and to read out the TOC data of the optical disc associated with the array number "3". The TOC data thus read out is stored in the address region associated with the array number "3" in the TOC data file of the data register memory 58 associated with the array number "3", under control by the controller based upon the flag information. The array number "2" is skipped by the rotary table driving circuit 12 as the corresponding disc cartridge 1 is not loaded.

The rotary table driving circuit 12 then causes the rotary table to be rotated in order to shift the spindle motor 15 and the optical pickup 14 to a position registering with the disc cartridge 1 having the array number "4" and to read out the TOC data of the optical disc associated with the array number "4". The TOC data thus read out is stored in the address region associated with the array number "4" in the TOC data file of the data register memory 58 associated with the array number "4".

The user then actuates the key of the ten-key selection area 32 having the number "4" in order to reproduce the optical disc having the array number "4". The key input data is supplied to the controller 57 which then outputs the key input to the rotary table driving circuit 12.

The rotary table driving circuit 12 then is responsive to the key input data and causes the rotation of the rotary table in order to shift the spindle motor 15 and the optical pickup 14 to a position registering with the disc cartridge 1 having the array number indicated by the key input data, herein the array number "4". The optical pickup 4 causes the information signals to be reproduced from the optical disc of the disc cartridge 1 having the array number "4".

The key input data from the controller 57 is also supplied to the character data processor 53 and the graphic data processor 55 in the display processing circuitry 52 of the display unit. The character data processor 53 is responsive to the key input data supplied thereto to read out the title data of the optical disc and the play time data from the TOC data for the array number "4" of the data register memory 58. The data processor 53 routes the title data, the play time data and the track address data supplied from the address data extraction circuit 23 of the optical disc reproducing device. The graphic data processor 55 is responsive to the supplied key input data to append additional data for making color display of the cartridge symbol SM1 having the array number "4" to the generated graphic data. The resulting combined data is supplied to the display processor 56.

The display processor 56 synthesizes character data supplied from the character data processor 53 and the graphic data processor 55 in order to display the character data in the display region 31a and the graphic data in the display region 31b.

Thus the disc title, array number, track number and the play time are displayed in the display region 31a. On the other hand, only the outer profile a of the cartridge symbol SM having the array number "2" and the combination of the outer profile a, the shutter simulating symbol b and the circle c for each of the cartridge symbols SM1 having the array numbers "1", "3" and "4" are displayed in the display region 31b. Only the cartridge symbol SM1 having the array number "4" is displayed in color.

Among the character data displayed in the display region 31a, the disc title and the array number are modified by the array number entry operation of the ten-key selection area 32. The track number is updated as the updated track address is caused to enter the character data processor 53 via the address data extracting section 23 as the optical disc reproduction in the main member of the reproducing apparatus 4 proceeds. The play time is updated by the second-based countup (count update) of clock signals sequentially input from a timer 59 to the character processor 53.

Among the graphic data displayed in the display region 31b, the color display of the cartridge symbol SM1 for the optical disc being reproduced is modified by the inputting operation of the array number of the ten-key selection area 32.

If, while the optical disc having the array number "4" is being reproduced, the select button 33 on the operating panel 5 is pressed, the audio apparatus shifts to the sound field control mode. The on-signal generated on actuation of the select button 33 is supplied to the controller 57. The controller 57 is responsive to the supply of the on-signal to retrieve the status flag information within the data register memory 58. If, as a result of the retrieval, there is found no bit set indicating that the mode is the sound field control mode, the bit is set and a sound field control command signal is output to the sound field processor 41 and the graphic data processor 55 in the display unit. The sound field processor 41 permits data entry based upon the inputting of the sound control command signal from the controller 57.

Consequently, the dashboard symbol SM2 is displayed on top of the cartridge symbols SM1 arranged in two rows by two columns in the display region 31b, while the rear shelf symbol SM3 is displayed below the cartridge symbols SM1 and array symbols are displayed in the associated cartridge symbols SM1 and SM2.

The cartridge symbol SM1 displayed in the display region 31b has a shape similar to the seat array in the car compartment. If the sound image is desired to be tuned to the driver's seat the array number "3" of the cartridge symbol SM1 at the array position of the driver's seat is entered using the ten-key selection area 32.

That is, the key input data by the ten-key selection area 32 is routed to a sound image processing section 41d of the sound processor 41 which is in the key-input state, The sound image processing section 41d has a memory therein in which a table correlating the array number with the actual seat position is registered as a data table. The sound image processing section 41d collates the array number indicated by the input data entered by the ten-key selection area 32 with the array number in the data table for indexing the actual seat position and executes processing for improving the fixed position sense of the sound image in connection with the thus indexed seat position.

If the select button 33 is again actuated, the on-signal derived by actuation of the select button 33 is again supplied to the controller 57. The controller retrieves the bit state of the flag information in the data register memory 58 indicating that the mode is the sound field control mode. Since the bit indicating that the mode is the sound field control mode is set at this time by the first actuation of the select button 33, the controller 57 outputs a sound field control mode release signal to the sound field processor 41 and the graphic data processor 55 in the display unit by inverting this bit. The sound field processor 41 inhibits data entry based upon the sound field mode release signal from the controller 57.

The graphic data processor 55 in the display unit is responsive to the sound field mode release signal from the controller 57 to erase data of the dashboard symbol SM2 and the rear shelf symbol SM3 from the currently displayed graphic data. The data processor 55 formulates the graphic data from which the currently displayed array number of the cartridge symbol SM1 not loaded in the magazine 2 has been erased and transmits the formulated graphic data to the display processor 56.

Consequently, the dashboard symbols SM2 on the top and bottom of the cartridge symbols SM1 displayed in the display region 31b during the sound field control mode are erased and the array number associated with the disc cartridge 1 not loaded in the magazine 2 is also erased.

Thus, with the apparatus of the first embodiment of the present invention, attributes of the disc cartridge 1 for the optical disc being reproduced, such as the array number, title or the like, are displayed as characters in the display region 31a. The array configuration of the four disc cartridges 1 as loaded in the magazine 2 are displayed in the display region 31b by four cartridge symbols SM1 arrayed in two rows by two columns. The loading state of the disc cartridges 1 in the magazine 2 introduced into the main member of the reproducing apparatus 4 is displayed by selective diagrammatic display of the respective cartridge symbols SM1. Thus, by viewing the array configuration and the loading state of the disc cartridges 1 as displayed in the display region 31b, the user may intuitively grasp how many disc cartridges 1 are contained and in which positions of the two rows by two columns the disc cartridges are loaded.

The graphic display for the disc cartridge for the optical disc being reproduced (cartridge symbol SM1) is displayed in a color different from that for the remaining disc cartridges (cartridge symbols SM1). Thus it becomes possible to identify intuitively which optical disc of the disc cartridge 1 is being reproduced without the necessity of checking for the attributes of the disc cartridges 1 displayed in the display region 31a, such as the array number or the title.

In addition, the display configuration of the four cartridge symbols SM1 is somewhat similar to the seat array in the car compartment. Thus, when selecting the seat position under consideration with a view to improving the fixed sound image sense in the sound field control mode, it is possible for the user to identify the seat position under consideration intuitively on simply viewing the cartridge symbols SM1 arrayed in two rows by two columns. Consequently, the sound field processor may be significantly improved in operability.

The recording and/or reproducing apparatus for a disc-shaped recording medium according to a second embodiment of the present invention is now explained. Similarly to the first embodiment, the present second embodiment is directed to a car-laden sound reproducing apparatus.

Similarly to the first embodiment the sound reproducing apparatus of the present embodiment also has a sound field processor.

The optical disc used in the second embodiment also has information signals recorded in the recording region, such as titles of the music signals or so-called album title, referred to hereinafter as table-of-contents data (TOC data).

Figures 10A, 10B:
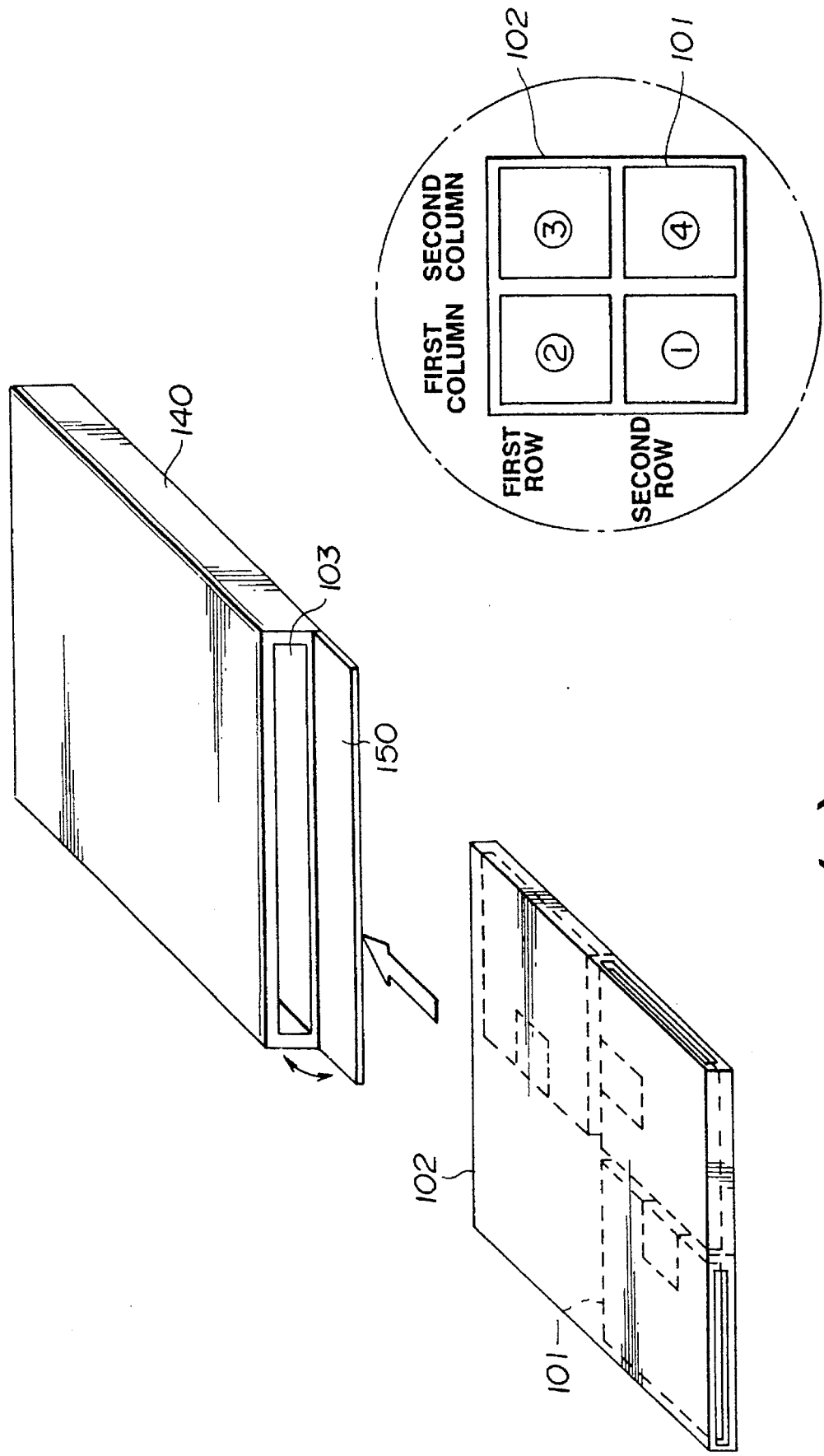

The optical disc reproducing apparatus includes a main member of the reproducing apparatus 140 and an operating panel 150, as shown in FIG. 10a. Into the main member of the reproducing apparatus 140 is inserted via an entrance/exit opening 103 a magazine 102 in which four disc cartridges 101 at the maximum may be loaded in a planar array of two rows by two columns. The operating panel 5 is mounted for opening/closing movement with respect to an entrance/exit opening 103 by a hinge, not shown, on the front surface of the main member of the reproducing apparatus 140.

Within the main member of the reproducing apparatus 140 is mounted a rotary table for rotation with respect to a chassis, not shown. On the upper surface of the rotary table, there are mounted a spindle motor and an optical pickup, both of which are halted at a pre-set position (home position) as a result of initial rotation of the rotary table on power on of the main member of the reproducing apparatus 140. When the magazine 102 having multiple disc cartridges 101 loaded thereon is introduced via the entrance/exit opening 103 into the main member of the reproducing apparatus 140, the spindle motor and the optical pickup are positioned in register with the disc cartridge 101 loaded at the second row of the first column, that is, at a position indicated by the array number "1" in FIG. 10b. When the shutter mounted on this disc cartridge 101 is opened, the spindle motor 115 and the optical pickup 114 are positioned in register with an exposed portion of the optical disc enclosed within the disc cartridge 101.

On the upper end of the spindle motor 115 is mounted a turntable on which is loaded an optical disc of the selected disc cartridge 101. The optical pickup is made up of a laser light source for radiating a laser beam for reading out information signals recorded on the optical disc, an objective lens for converging the laser beam from the laser light source on the recording surface of the optical disc, and a photodetector for photo-electrically converting the light reflected by the recording surface of the optical disc into electrical detection signals. The objective lens is driven by an actuator, not shown, in the focusing direction and in the tracking direction based upon focusing error signals and tracking error signals.

The optical pickup 114 is driven radially to the optical disc loaded on the turntable by a linear motor feed mechanism.

Figure 11:
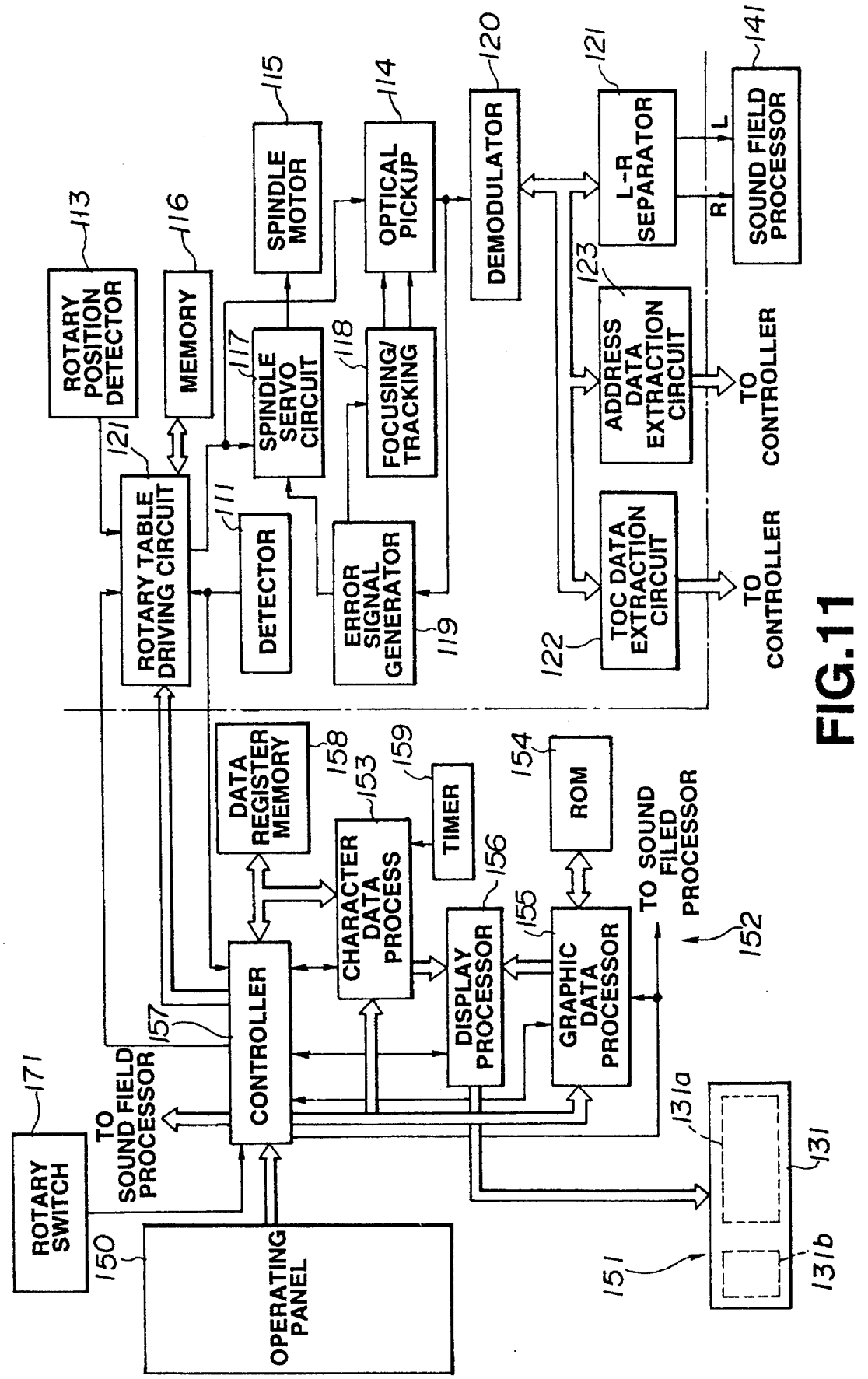
FIG. 11 is block diagram showing an arrangement of an optical disc reproducing apparatus as the recording and/or reproducing apparatus for the disc-shaped recording medium according to a second embodiment of the present invention.

The reproducing circuitry of the main member of the reproducing apparatus 140 is explained by referring to FIG. 11. The reproducing circuit system includes a cartridge detector 111 for optically detecting the disc cartridge 101 loaded on the magazine 102 introduced into the main member of the reproducing apparatus 140, a rotary table driving circuit 112 for rotationally driving the rotary table in one direction, and a rotary position detector 113 for detecting the rotary position or the angle of rotation of the rotary table. The rotary table driving circuit 112 first runs the rotary table in rotation, based upon reception on power-on of a start signal from a controller in the display unit as later explained for halting the optical pickup 114 and the spindle motor 115 at the home position, that is, at a position registering with the disc cartridge 101 loaded on the second row of the first column in FIG. 10b.

The detection signal from the cartridge detector 111 is supplied to a controller as later explained. The controller formulates the flag information, based upon the detection signal supplied thereto, and stores the flag information in a data register memory 158 as later explained. The detection signal from the cartridge detector 111 is also supplied to a rotary table driving circuit 112. The rotary table driving circuit 112 stores the detection signal supplied thereto in order to control the driving rotation of the rotary table based upon the contents of the detection signal. That is, the rotary table driving circuit 112 runs the rotary table in rotation as it causes the spindle motor 115 and the optical pickup 114 to make a skipping movement so that these are not positioned in register with the portions of the magazine not carrying the disc cartridge 101.

The rotary table driving circuit 112 rotates the rotary table in one direction based upon the number data from the controller as later explained for halting the optical pickup 114 and the spindle motor 115 at the position registering with the disc cartridge 101 corresponding the number data. For controlling the rotation of the rotary table, it is possible to read out the rotational angle data corresponding to the input number data from a rotational angle data table in a memory 116, count the number of rotational clock signals supplied in succession from the rotational position detection circuit 113 and to halt the rotational table when the count value coincides with the read-out rotational angle data.

The reproducing circuitry also includes a spindle servo circuit 117, a focusing/tracking servo circuit 118, an error signal generating circuit 119, a demodulating circuit 120, a L-R separating circuit 121, a TOC data extracting circuit 122 and an address data extracting circuit 123. The spindle servo circuit 117 servo-controls the spindle motor 115 so that the optical disc is run in rotation at a constant linear velocity. The focusing/tracking servo circuit 118 controls the actuator of the optical pickup 114 for focusing controlling and tracking controlling the objective lens. The error signal generating circuit 119 generates spindle servo error signals, focusing servo error signals and tracking servo error signals, based upon detection signals from the optical pickup 114. The demodulating circuit 120 converts the detection signals from the optical pickup 114 and decodes code data appended for error correction in order to output the resulting signals as playback data. The L-R separating circuit 121 converts the playback data from the demodulating circuit 120 to analog signals and separates them into left channel signals and right channel signals which are output as left side audio signals and right side audio signals, respectively. The TOC extracting circuit 122 extracts TOC data from the playback data from the demodulating circuit 120. The address data extracting circuit 123 extracts track address data from the playback data from the demodulating circuit 120.

The TOC data from the TOC data extracting circuit 122 is stored in a TOC data file logically apportioned in a data register memory through a controller as later explained.

When the rotary table driving circuit 112 has rotated the rotary table in one direction and has halted the optical pickup 114 and the spindle motor 115 at a position registering with the disc cartridge 101 corresponding to the input number data, it issues a start signal to a vertical movement mechanism producing the vertical movement of the spindle motor 115. The vertical movement mechanism causes the spindle motor 115 to be moved upwards, for example, responsive to the start signal from the rotary table driving circuit 112, for loading the optical disc on the turntable of the spindle motor 115.

The start signal from the rotary table driving circuit 112 is also supplied to the spindle servo circuit 117 and to the optical pickup 114. The spindle servo circuit 117 drives the spindle motor 115 responsive to the start signal from the rotary table driving circuit 112 and the end of loading of the optical disc on the turntable. As a result, the optical disc loaded on the turntable is rotated with, for example, a constant linear velocity (CLV). The optical pickup 114 is started responsive to the start signal from the rotary table driving circuit 112 and moved radially to the optical disc as it radiates the laser beam on the recording surface of the optical disc for sequentially reading out the information signals recorded thereon.

The right side audio signals and the left side audio signals, output from the L-R separating circuit 121, are supplied to a sound field processor 141 as later explained.

Figure 12:
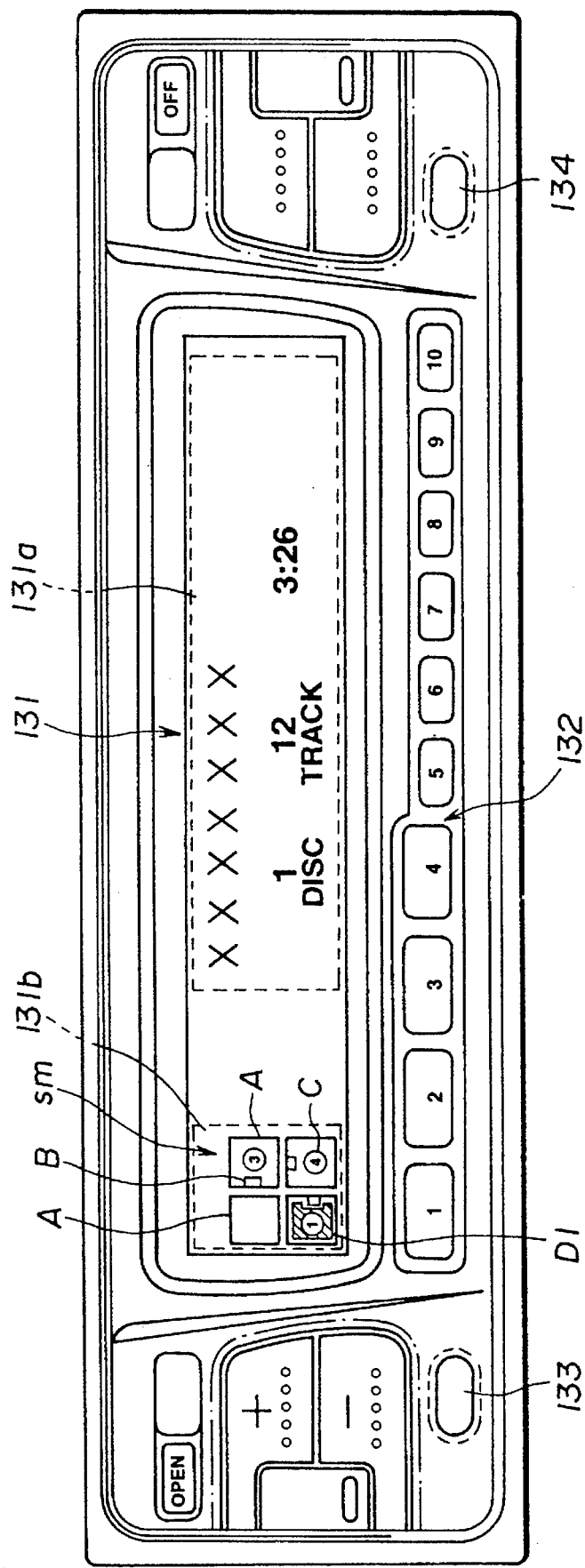
FIG. 12 is a front view showing an operating panel of the optical disc reproducing apparatus according to the second embodiment of the present invention.

The operating panel 5 has a display surface 131 at a mid part on its front surface and a transverse array of ten-keys 132 below the display surface 131, as shown in FIG. 12. A selector button 133 for starting the sound field processor is arranged on the left-hand side of the ten-key selection area 132. A file key 134 for displaying the title of each optical disc of the disc cartridges 101 loaded in the magazine 102 is arranged on the right-hand side of the ten-key selection area 132.

Figure 14:
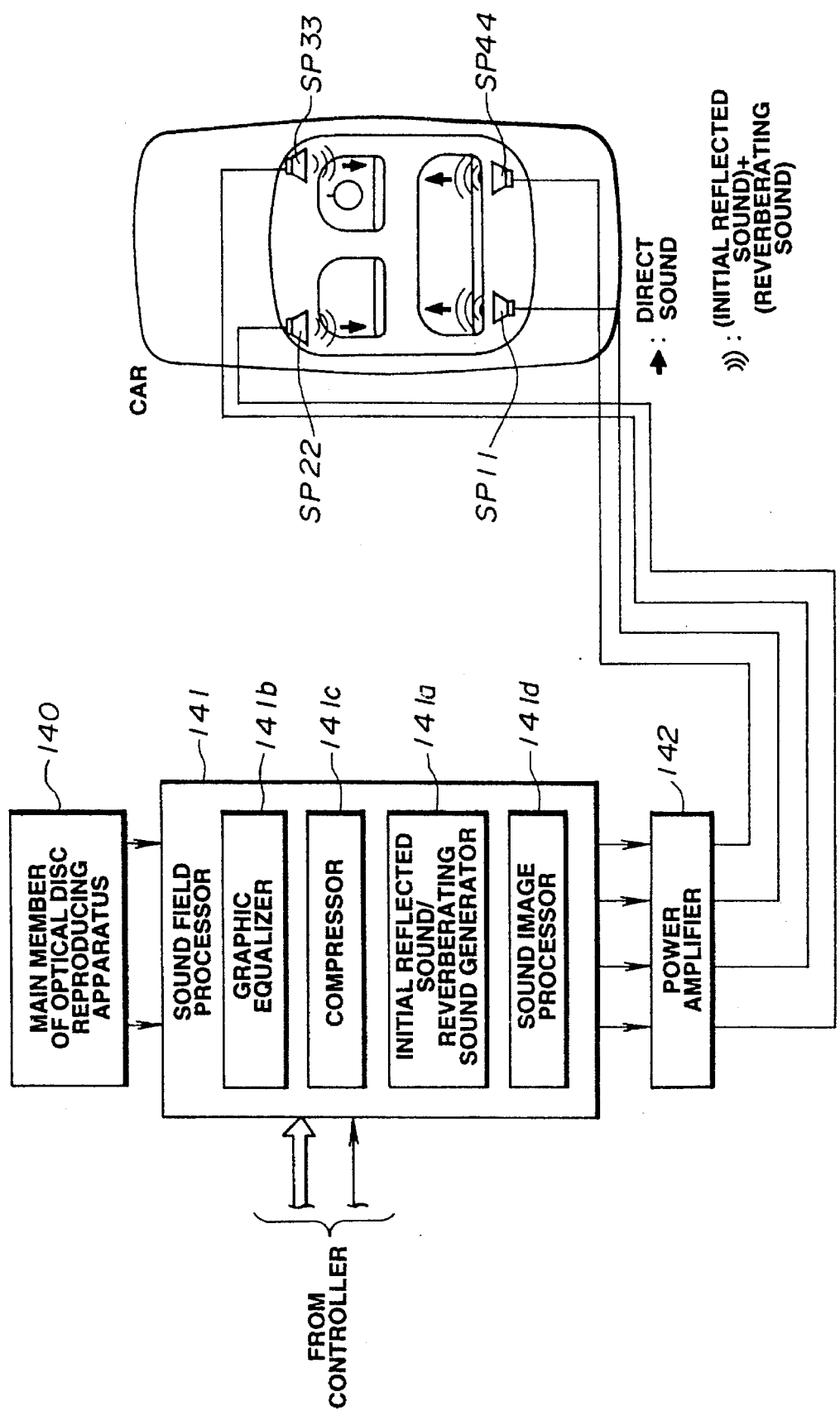
FIG. 14 is a block diagram showing an arrangement of a sound field processor.

The sound field processor 141 is arranged between the main member of the reproducing apparatus 140 and a four-fold power amplifier 142 connected to four speakers SP11, SP22, SP33 and SP44 arranged at the four corners in the car compartment, as shown in FIG. 14. The sound field processor 141 includes a power amplifier 142, an initial reflected sound/reverberating sound generator 141a, a graphic equalizer 141b, a compressor 141c and and a sound image processor 141d. The initial reflected sound/reverberating sound generator 141a generates the initial reflected sound and the reverberating sound based upon the data of the sound field, such as a music hall. The graphic equalizer 141b corrects the frequency response and transmission characteristics of the speakers. The compressor 141c is used for improving the S/N ratio by reducing the dynamic range. The sound image processor 141d is used for improving the fixed position sense of the sound image by adjusting the phase delay of the audio output and the sound volume balance of the output sound from the 4-channel speakers SP11 to SP44 in connection with seat positions associated with the seat numbers as selected by the operating panel 150.

The display unit 151 arranged on the operating panel 150 shown in FIG. 11 includes a display processing circuitry designed for generating display data for making a screen display.

The display unit 151 includes a liquid crystal display, for example, which has its display screen 131 divided into two display regions 131a and 131b, as shown in FIG. 11. The display region 131a is a character display region for displaying letters, figures and so forth. The other display region 131b is a graphic display region for displaying a symbol mark simulating the outer shape of the disc cartridge 101, termed a cartridge symbol SM, as shown in FIG. 12. The display region 131b is arranged on the left side part of the display screen 131 of the display unit 151, that is, a portion above the key "1" of the ten-key selection area 132. The background of the display screen is set to a white color hue.

Four of the cartridge symbols SM are displayed in correspondence with the number of the disc cartridges 101 loaded in the magazine 102 inserted into the optical disc reproducing apparatus. These four cartridge symbols SM are arranged in two rows by two columns in correspondence with the array of the disc cartridges 101 loaded in the magazine 102. That is, the cartridge symbols SN are of the symbol configuration corresponding to the arraying configuration of the disc cartridges 101 loaded in the magazine 102, The cartridge symbol SM has a symbol configuration consisting of the outer profile A, a simulated shutter of the disc cartridge B and a circle C, as shown in FIG. 12. The array number (see FIG. 10b) of the disc cartridge 101 loaded in the magazine 102 is displayed within the circle C.

The cartridge symbol SM for the section of the magazine 2 not loaded with the disc cartridge 101 has only the outer profile A. In the present embodiment the cartridge symbol SM for the array number "2" shown in FIG. 5b has such a configuration.

In the display region 131b, a first cursor D1, moved responsive to the selecting operation from a rotary switch as later explained, is displayed. The location of the first cursor D1 may be identified by the region exclusive of the outer profile A, the circle C and the shutter-simulating symbol B of the cartridge symbol SM associated with the selected optical disc being displayed in a blue color hue, as shown by hatching in FIG. 12.

In the display region 131a, the title of the optical disc being reproduced, the array number of the disc cartridge 101 containing the optical disc, the track number being reproduced and the play time are usually displayed in characters, as shown in FIG. 12.

By actuating the file key 134, the array number of the disc cartridge 101 and the title of the optical disc contained in the disc cartridge 101 are displayed in characters, as shown in FIGS. 13a to 13d. The display configuration in the display region 131a in the present second embodiment is similar to that in the display region 131b, that is, the sets of the array numbers and the titles are arrayed in two rows by two columns, in a similar manner to the array configuration of the disc cartridges 101 loaded in the magazine 102.

That is, the display configuration in the display region 131a is such that the array number "1" of the disc cartridge 101 loaded in the second row of the first column of the magazine 102 as shown in FIG. 10b are displayed, along with the title of the optical disc, in the second row of the first column of the display region 131a. Similarly, the array number "2" of the disc cartridge 101 loaded in the first row of the first column of the magazine 102 and the title of the optical disc are displayed in the first row of the first column of the display region 131a. The array number "3" of the disc cartridge 101 loaded in the first row of the second column of the magazine 102 and the title of the optical disc are displayed in the first row of the second column of the display region 131a, while the array number "4" of the disc cartridge 101 loaded in the second row of the second column of the magazine 102 and the title of the optical disc are displayed in the second row of the second column of the display region 131a.

It is noted that, in the row-column position of the magazine not-loaded with the disc cartridge 101, only the array number is displayed, but the title is not displayed. In the embodiment shown in FIGS. 13a to 13d, since no disc cartridge is loaded in the first row of the first column associated with the array number "2" of the magazine 102, only the number "2" is displayed in the display region 131a, without displaying the title.

In the display region 131a, a second cursor D2, moved on the display region 131a responsive to the selecting operation from a rotary switch as later explained, is displayed. The second cursor D2 has the same color as that of the first cursor D1 moved and displayed on the first display region 131b. The title of the optical disc at which the second cursor D2 is located has the background displayed with the same color as that of the second cursor and has title letters displayed in white by so-called luminance inversion display.

Figure 15:
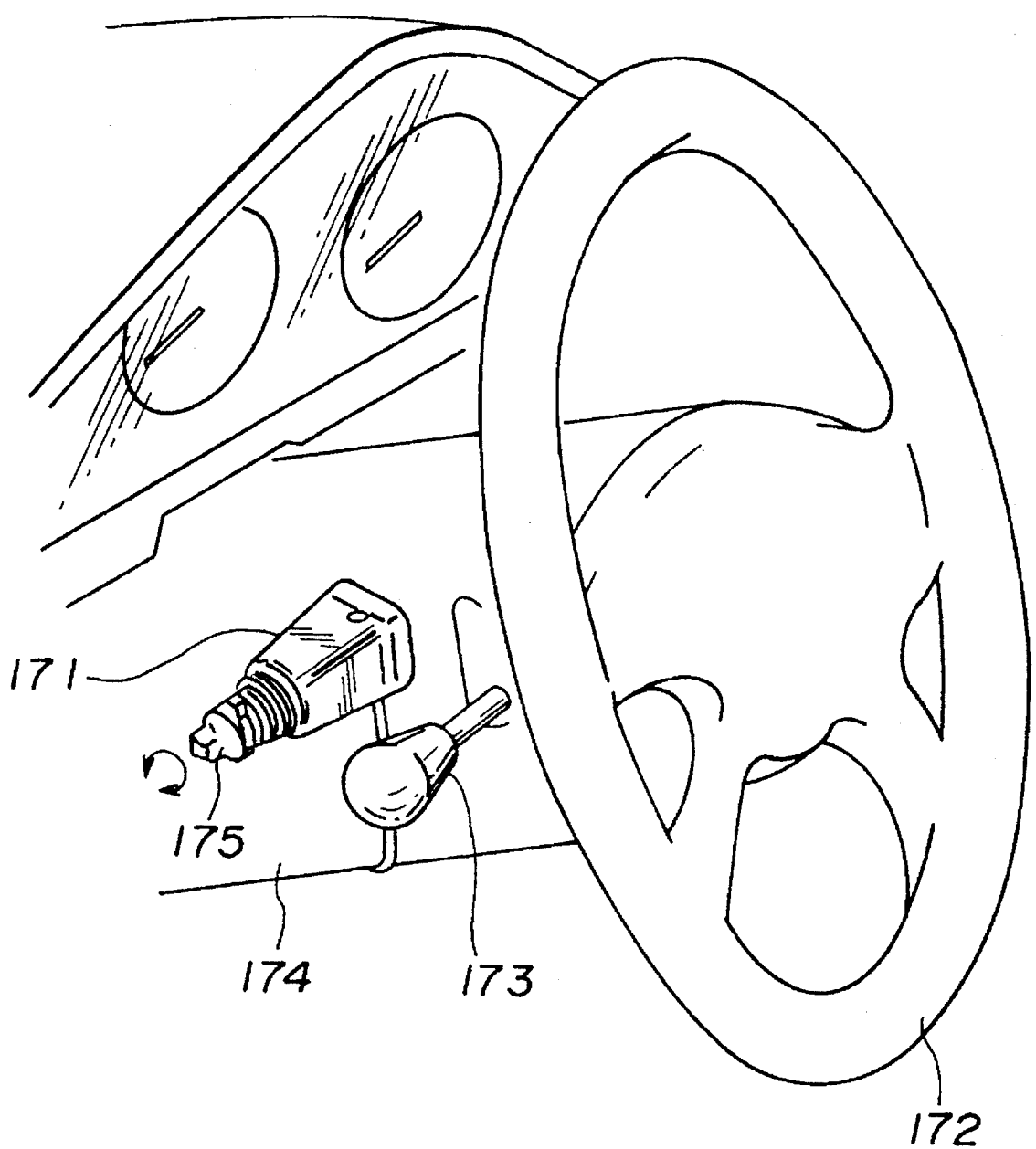
FIG. 15 is a perspective view showing the appearance and the mounting state of a rotary switch employed in the apparatus according to the second embodiment of the present invention.

Referring to FIG. 15, a rotary switch 171 for selecting the disc cartridges 101 in the magazine 102 has a rotary knob 175 rotatably mounted at the distal end thereof. By rotating the rotary knob 175 in the direction shown by an arrow in FIG. 15, a plurality of switches, not shown, provided in the rotary switch 171, may be turned on and off for switching. The results of the switching operations by the rotary knob 175 are routed via a wire connected to the rotary switch 175 to a controller as later explained. The rotary switch 171 is mounted substantially horizontally on a steering column 174 at the back of a wiper lever 173 in the vicinity of a steering handle 172 of a car in order for the driver to actuate the switch 171 easily, as shown in FIG. 15. If, for example, the rotary knob 175 is rotated clockwise, a signal (+) is output from the rotary switch 171, whereas, if the rotary knob 175 is rotated counterclockwise, a signal (−) is output from the rotary switch 171. If supplied with the (+) signal, the controller is operated responsive to clockwise operation of the rotary switch 175 to control the main member of the apparatus 140 in order to select the disc cartridge 101 in the magazine 102 so that the array number of the disc cartridge 101 is incremented by one for each knob actuation. After the array number "4", the array number reverts to "1". Conversely, if supplied with the (−) signal, the controller selects the disc cartridges 101 in the magazine 102 so that the array number of the disc cartridge 101 is decremented by one for each knob actuation. After the array number "1", the array number reverts to "4". The details of the control operation will be explained subsequently.

The display processing circuitry 152 in the display unit 151 includes a character data processor 153, a ROM 154, a graphic data processor 155, a display processor 156 and a controller 157, as shown in FIG. 11. The character processor 153 generates character data to be displayed in the display region 131a. The graphic data processor 155 generates graphic data to be displayed in the display region 131b. The display processor 156 synthesizes the graphic data from the graphic data processor 155 and the character data from the character data processor 153 and displays the graphic data and the character data in the display region 131a and in the display region 131b of the display screen 131, respectively. The controller 157 is responsive to actuation of the various keys on the operating panel 150 to supply control signals to the above-mentioned various circuits and to the main member of the apparatus 140.

Unless the file key 134 is actuated, the character data processor 153 generates the array number of the disc cartridge 101 being reproduced, the title of the optical disc, the number of the track being reproduced, and the play time. If the file key 134 is actuated, the data processor 153 generates the display data for displaying the array number of the disc cartridge 101 loaded in the magazine 102 and the title of the optical disc in a list of two rows by two columns. The data processor 153 also generates character data comprised of color data concerning the second cursor display and data for luminance inversion display which becomes necessary in connection with the second cursor display.

The graphic data processor 155 reads out fixed data concerning the cartridge symbol SM stored in the ROM 154, herein data concerning the outer profile A, and generates from the read-out fixed data the outer profile array data for displaying the outer profile data in a pre-set array configuration of two rows by two columns. In addition, the graphic data processor 155 generates graphic data comprised of data concerning the shutter-simulating profile and the array number data as well as the color display data for the first cursor selectively combined into the outer profile array data.

The operation of the audio apparatus will be explained in conjunction with the operation of the optical disc reproducing apparatus and the sound field processor.

When the power source of the audio apparatus is turned on, a start signal is routed from the controller 157 to the rotary table driving circuit 112. The rotary table driving circuit 112 runs the rotary table in rotation, responsive to the start signal from the controller 157, until the optical pickup 114 and the spindle motor 115 are stopped at the home position, that is, at a position registering with the optical disc loaded in the second row of the first column, indicated by the array number "1" in FIG. 10b.

If then the magazine 102, containing the disc cartridges 101 at the sections thereof having the array numbers "1", "3" and "4" without containing the disc cartridge 101 at the section thereof having the array number "2", is inserted into the main member of the apparatus 140 via the entrance/exit opening 103, the loading state of the disc cartridges 101 loaded in the magazine 102 is optically detected by the cartridge detector 111. A detection signal from the detector 111 is routed to the controller 157 and the rotary table driving circuit 112. The detection signal from the cartridge detector 111 is stored as the flag information in the data register memory 158. On the other hand, the rotary table driving circuit 112 stores the detection signal from the cartridge detector 111 as the information for rotation skipping.

The controller 157 then reads out the flag information from the data register memory 158 and routes the information to the graphic data processor 155. The graphic data processor 155 generates the graphic data based upon the flag information from the controller 157. The graphic data in this case comprises the display only of the outer profile A for the cartridge symbol SM associated with the array number "2" and the combination of the outer profiles A, the shutter-simulation profiles B and the circles C for the cartridge symbols "1", "3" and "4".

These graphic data are displayed via the display processor 156 in the display region 131b of the display screen 131.

The TOC data of the optical disc associated with the array number "1" is then read out based upon the start signal from the rotary table driving circuit 112. The TOC data thus read out are stored in the address region in the TOC file associated with the array number "1".

The rotary table driving circuit 112 runs the rotary table in rotation in order to shift the spindle motor 115 and the optical pickup 114 to a position registering with the disc cartridge 101 having the array number "3" in order to read out the TOC data of the optical disc having the array number "3". The TOC data thus read out is stored in the address region of the TOC data file of the data register memory 158 associated with the array number "3", under control by the controller 157, based upon the flag information. The disc cartridge 101 is not loaded in the location of the magazine 102 having the array number "2", so that the array number "2" is skipped by the rotary table driving circuit 112.

The rotary table driving circuit 112 again runs the rotary table in rotation for shifting the optical pickup 114 and the spindle motor 115 to the address region in the TOC data file of the data register memory 158 having the array number "4" in order to read out the TOC data of the optical disc associated with the array number "4" in the same manner as described above. The read-out TOC data is then stored in the address region in the data file of the data register memory 158 associated with the array number "4" under control by the controller 157 based upon the flag information.

Turning to the playback operation, the key number "1" in the ten-key selection area 132 is actuated for reproducing the optical disc associated with the array number "1". The key input data is supplied to the controller 157. The controller 157 outputs the key input data to the rotary table driving circuit 112.

The rotary table driving circuit 112 is responsive to the key input data to run the rotary table in rotation for shifting the optical pickup 114 and the spindle motor 115 to the position associated with the disc cartridge 101 having the array number indicated by the key input data, herein the array number "1". As a result, the information signals are read from the optical disc by the optical pickup 114.

The key input data from the controller 157 is also supplied to the character data processor 153 and the graphic data processor 155 of the display processing circuitry 152 of the display unit. The character processor 153 is responsive to the key input data to read out the title data and the play time data of the optical disc from the TOC data of the data register memory 158 concerning the array number "1". The title data and the play time data thus read out and the track address data supplied from the address data extraction circuit 123 are supplied to the display processor 156. On the other hand, the graphic data processor 155 is responsive to the key input data to append the additional data necessary for displaying the first cursor D1 to the cartridge symbol SM having the array number "1" in the generated graphic data in color and routes the resulting combined data to the display processor 156.

The display processor 156 synthesizes the character data and the graphic data supplied from the character data processor 153 and the graphic data processor 155, respectively. The display processor 156 causes the character data and the graphic data to be displayed in the display regions 131a and 131b, respectively.

Thus the disc title, array number, track number and the play time are displayed in the display region 131a. In the display region 131b, only the outer profile for the cartridge symbol SM associated with the array number "2" is displayed, while the combination of the outer profiles A, the shutter-simulation profiles B and the circles C for the cartridge symbols "1", "3" and "4" is displayed. In addition, the first cursor D1 is displayed within the cartridge symbol SM associated with the array number "1".

Of the character data displayed in the display region 131a, the optical disc title and the array number are modified by the entry operation of the corresponding array number by the ten-key selection area 132. The track number is updated by the track address reproduced with the reproduction of the optical disc by the main member of the reproducing apparatus 140 and the entering the character data processor 153 via the address data extraction circuit 123. The play time is updated by the second-based count updating of the clock signals sequentially entering the character data processor 153 from a timer 159.

Of the graphic data displayed in the display region 131b, the display of the first cursor in the cartridge symbol SM being reproduced is modified by the array number entering operation by the ten-key selection area 132 or by the selective operation by the rotary switch 171.

The selection button 133 on the operating panel 150 is then actuated whilst the optical disc associated with the array number "1" is displayed. This causes the audio apparatus to proceed to the sound field control mode. The on-signal produced actuating the selection button 133 is routed to the controller 157. The controller 157 is responsive to this on-signal to retrieve the status flag information in the data register memory 158. If the result of retrieval indicates that a bit showing that the current mode is the sound field control mode is not set, the bit is set, and a sound field control command signal is output to the sound field processor 141 and the graphic data processor 155 in the display unit. The sound field processor 141 permits data entrance responsive to the entry of the sound field control command signal from the controller 157.

The cartridge symbols SM displayed in the display region 131b are similar in profile to the seat array in the car compartment. If it is desired to set the sound image to the driver's seat, it suffices to enter the array number of the cartridge symbol SM at the array position corresponding to the driver's seat using the ten-key selection area 132.

The key input data by the ten-key selection area 132 is routed to the sound image processor 141d of the sound processor 141 which is in the key input state. The sound image processor 141d has built therein a memory in which a table associating the array numbers with the actual seat positions is registered as a data table. The sound field processor 141d collates the array numbers indicated by the key input data as input by the ten-key selection area 132 with the array numbers of the data table for indexing the actual seat positions and performs the operation of improving the fixed sound image sense with respect to the thus indexed seat position.

If the selection button 133 is again actuated, the on-signal resulting from the actuation of the selection button 133 is again routed to the controller 157 which then retrieves the bit state of the flag information indicating that the mode is the sound field control mode. At this time, the bit indicating that the mode is the sound field control mode is set. Consequently, the controller 157 inverts the bit in order to output a sound field control release signal to the sound processor 141 and the graphic data processor 155 in the display unit. The sound field processor 141 inhibits data entry based upon the entrance of the sound field control release signal from the controller 157.

Figure 13A:
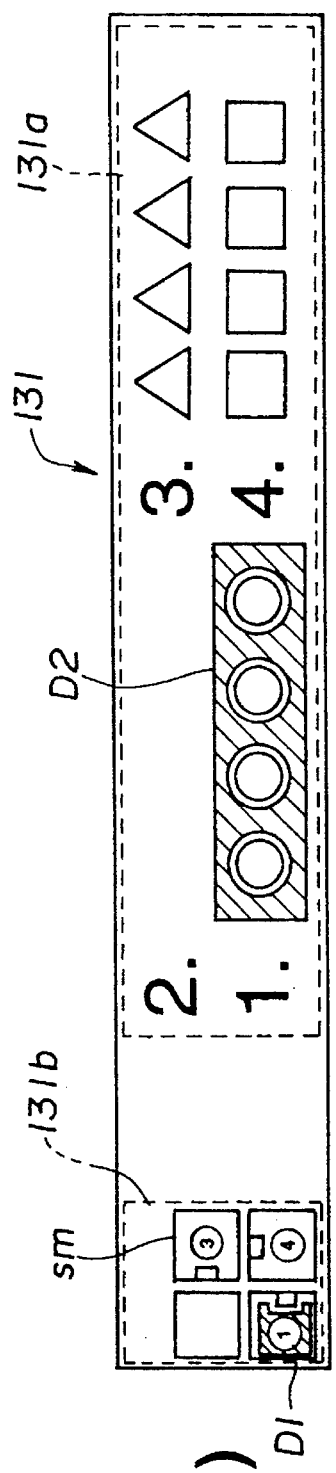

If the file key 134 on the operating panel 150 is actuated whilst the optical disc associated with the array number "1" is reproduced, the array number of the optical disc being reproduced, disc title, track number of the play time, as displayed on the display screen 131, are erased and, in their stead, the array number and the title of each optical disc loaded in the magazine are displayed as a list, as shown in FIG. 13a.

That is, the on-signal produced on actuation of the file key 134 is routed to the controller 57 which is then responsive thereto to retrieve the status flag information in the data register memory 158. If, as a result of retrieval, there is no bit set indicating that the list display is being made, the bit is set and a display demand signal is output to the character data processor 153. At this time, the array number data concerning the optical disc being displayed is output.

The character data processor 153 is responsive to the entry of the list display demand signal from the controller 157 to read out title data of each optical disc from the TOC data file in the data register memory 158. At this time, reference is made to the flag information indicating the loading state of the disc cartridges 101 and, as for the sections of the magazine not loaded with the disc cartridge, the corresponding title data is read out as the space data.

The data processor 153 formulates list data for list display of the array numbers of the disc cartridges 101 contained in the magazine 102 and the titles of the optical discs in two rows and two columns. Additionally, color data for display of the second cursor and data for luminance inversion display necessary for the second cursor display are selectively appended to the list data to produce character data which is actually displayed in the display region 131a. Since the array number of the optical disc being reproduced is "1", character data is produced which is comprised of the array number "1", coordinate data commanding the title display position and the second cursor displaying data appended to the list data.

The character data produced by the character data processor 153 is displayed via the display processor 156 in the display region 131a of the display screen 131, as shown in FIG. 11. The display configuration at this time is such that the second cursor D2 is located in the title display portion registering with the second row of the first column of the list display, with the title being displayed with luminosity inversion, as shown in FIG. 13a.

If, in the list display state, the rotary switch 171 is rotated clockwise, the (+) signal is generated by the rotary switch 171 and supplied to the controller 157. If fed with the (+) signal from the rotary switch 171, the controller 157 increments the array number data concerning the optical disc being reproduced by one (+1). If the array number for the optical disc being reproduced is "4", the array number data is set to "1". The cursor update signal and the updated array number data are supplied to the character data processor 153 and to the graphic data processor 155.

The character data processor 153 is responsive to the cursor update signal and the array number data from the controller 157 to produce character data which is comprised of the list data already displayed and the coordinate data appended thereto for indicating the position of the title of the number as indicated by the array number data and the second cursor display data.

The graphic data processor 155 formulates graphic data which is comprised of displayed data of the cartridge symbol in two rows by two columns, coordinate data indicating the position of the cartridge symbol SM as indicated by the array number data and the first cursor display data.

Figure 13B:
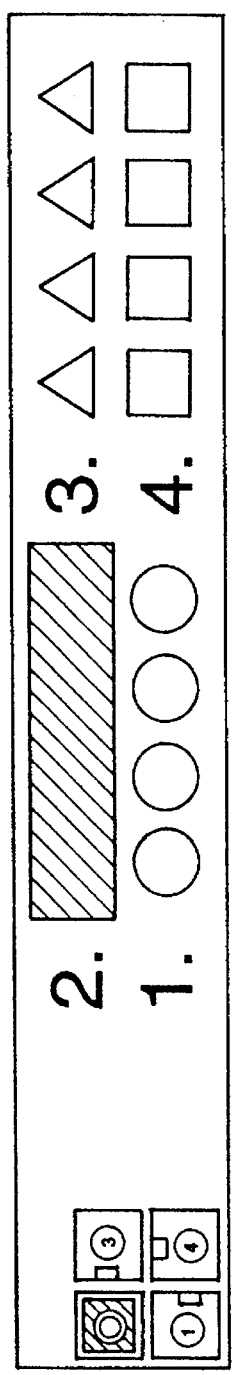

The character data produced by the character data processor 153 and the graphic data produced by the graphic data processor 155 are displayed via the display processor 156 in the display regions 131a and 131b of the display screen 131, respectively. The second cursor D2 displayed in the display region 131a is displayed at the position of the cartridge symbol SM registering with the array number "2" at the first row of the first column, and the title is displayed with luminance inversion, as shown in FIG. 13b. The first cursor D1 displayed in the display region 131b is displayed at the position of the cartridge symbol SM registering with the array number "2" at the first row of the first column, and the title is displayed with luminance inversion.

Figure 13C:
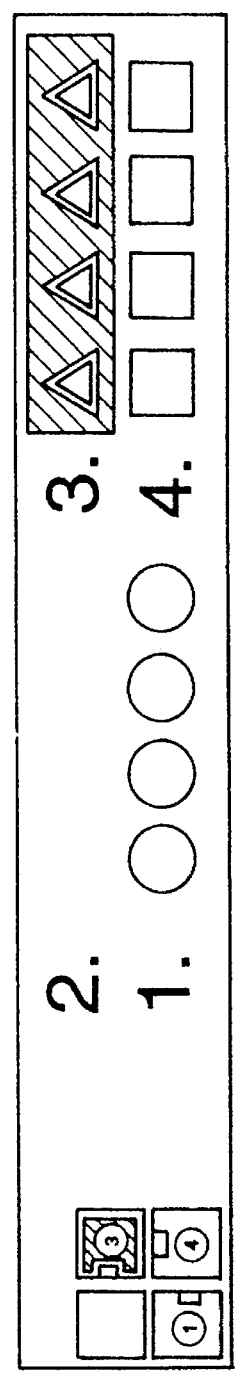

If the operating knob 175 of the rotary switch 171 is rotated clockwise, the second cursor D2 displayed in the display region 131a is displayed at the title position registering with the array number "3" at the first row of the second column, while the disc title is displayed with luminance inversion, as shown in FIG. 13c. The first cursor D1 displayed in the display region 131b is displayed at the position of the cartridge symbol SM registering with the array number "3" at the first row of the second column.

Figure 13D:
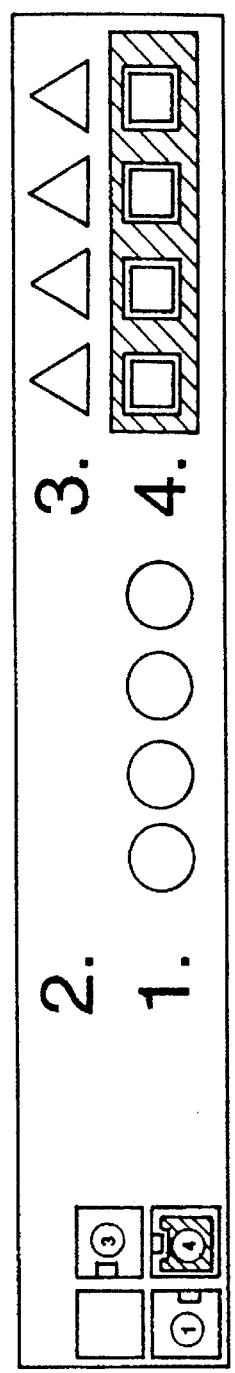

If the operating knob 175 of the rotary switch 171 is further rotated clockwise, the second cursor D2 displayed in the display region 131a is displayed at the title position registering with the array number "4" at the second row of the second column, while the disc title is displayed with luminance inversion, as shown in FIG. 13d. The first cursor D1 displayed in the display region 131b is displayed at the position of the cartridge symbol SM registering with the array number "4" at the second row of the second column.

If, with the first cursor D1 and the second cursor D2 displayed at the position registering with the array number "4" at the second row of the second column, the rotary switch 171 is left unattended for about two seconds, an interrupt signal due to timeout is fed from the timer 159 to the controller 157. The controller 157 is responsive to the entry of the interrupt signal from the timer 159 to output the updated array number data to the rotary table driving circuit 112.

The rotary table driving circuit 112 is responsive to the input array number data to run the rotary table in rotation for shifting the optical pickup 114 and the spindle motor 115 to a position registering with the number indicated by the array number data, herein the array number "4", for reproducing the associated optical disc.

If, as the optical disc having the array number "4" is reproduced, the operating knob 175 of the rotary switch 171 is rotated counterclockwise, the (−) signal is produced from the rotary switch 171 and fed to the controller 157 which then decrements the array number data for the optical disc being reproduced by one (−1). Nevertheless, if the array number of the optical disc being reproduced is "1", the array number data is set to "4". The cursor update signal and the updated array number data are routed to the character data processor 153 and to the graphic data processor 155.

The character data processor 153 is responsive to the cursor update signal and the array number data from the controller 157 to formulate character data comprised of the list data which is already displayed and which is now combined with coordinate data indicating the title of the number indicated by the array number data and character data for the second cursor.

On the other hand, the graphic data processor 155 generates graphic data comprised of data of the cartridge symbol at the second row of the second column which is already displayed and which is combined with coordinate data indicating the position of the cartridge symbol SM associated with the number indicated by the array number data and the first cursor displaying data.

If the operating knob 175 of the rotary switch 171 is rotated counterclockwise, the second cursor D2 displayed in the display region 131a is displayed at the title position registering with the array number "2" at the first row of the first column, while the disc title is displayed with luminance inversion, as shown in FIG. 13b. The first cursor D1 displayed in the display region 131b is displayed at the position of the cartridge symbol SM registering with the array number "2" at the first row of the first column.

If the operating knob 175 of the rotary switch 171 is further rotated counterclockwise, the second cursor D2 displayed in the display region 131a is displayed at the title position registering with the array number "1" at the second row of the first column, while the disc title is displayed with luminance inversion, as shown in FIG. 13a. The first cursor D1 displayed in the display region 131b is displayed at the position of the cartridge symbol SM registering with the array number "1" at the second row of the first column.

With the above-described optical disc reproducing apparatus, that is, the display unit 131 thereof, the array numbers of a plurality of disc cartridges 101 loaded in the magazine 102 and the titles of the optical discs are displayed as a list. In the display region 131b, the planar array state of the disc cartridges 101 loaded in the magazine 102 in two rows by two columns and the loading state of the disc cartridges 101 in the magazine 102 are graphically displayed as the cartridge symbols SM. It should be noted that the list display configuration in the display region 131a is similar to the array configuration of the disc cartridges 101 as displayed in the graphic display region 131a and to the loading state of the disc cartridges in the magazine 102, so that it becomes possible for the user to grasp intuitively how many disc cartridges 101 are loaded and in which of the two rows by two columns the disc cartridges are loaded by consulting the graphic display of the disc cartridges SM displayed in the display region 131b. It is also possible for the user to grasp intuitively how many disc cartridges 101 are loaded, in which of the two rows by two columns these disc cartridges are loaded, which attributes are possessed by the optical discs, and in which of the two rows by two columns the disc cartridges having the particular attributes are loaded, by consulting the list display concerning the disc cartridges 101 displayed in the display region 131a.

In addition, with the optical disc reproducing apparatus of the second embodiment the first cursor D1 is displayed in color and in register with the cartridge symbol SM for the optical disc from which the information signals are being reproduced. Consequently, the optical disc being reproduced can be identified immediately. In addition, the second cursor D2 is displayed in register with the title display of the optical disc from which information signals are being displayed. Furthermore, the title of the portion of the display unit where the second cursor D2 is displayed is displayed with luminance inversion, so that the optical disc being reproduced can be identified immediately.

On the other hand, when the rotary switch 171 is rotated for selecting the disc cartridges 101 one by one from the array in two rows by two columns of the disc cartridges 101, the second cursor D2 and the first cursor D1 are moved on the display regions 131a and 131b, respectively, depending on the direction of rotation of the operating knob, for selective actuation of the rotary switch 171. In this manner, it can be grasped intuitively which optical discs having certain attributes have been selected, while the exchange operation of the disc cartridges 101 into the magazine 101 is facilitated.

In the above-described optical disc reproducing apparatus, it is possible for four disc cartridges 101 to be loaded in the magazine in a planar array of two rows by two columns. The above-described embodiments may also be applied to an optical disc reproducing apparatus in which six discs, for example, may be stacked in a magazine with the plate surfaces lying horizontally and with vertical gaps between the adjoining discs in the vertical direction.

Figure 16:
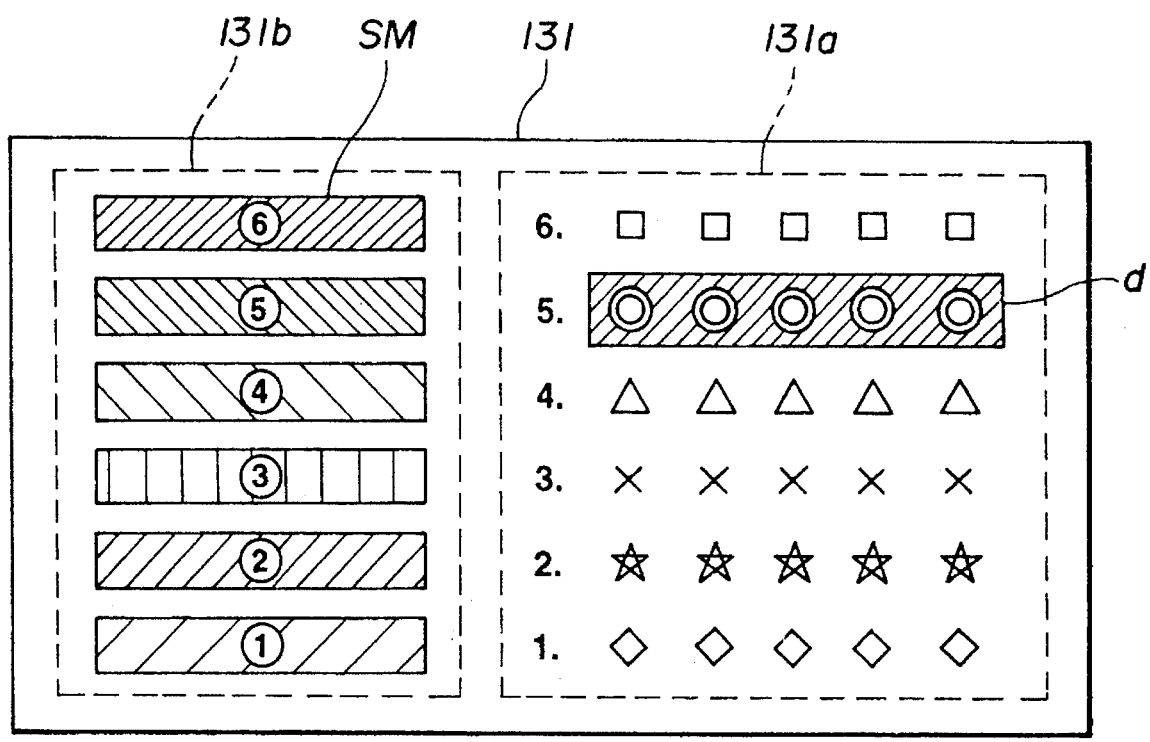
FIG. 16 illustrates another list display configuration on the display unit of the apparatus of the present invention.

The display surface alone is shown in FIG. 16 wherein the display regions 131b and 131a of the display screen are allocated at the left-hand and right-hand sides, respectively. Six of the symbol marks SM for the optical discs displayed in the display region 131b are arrayed horizontally. The array numbers are displayed in the symbol marks SM. The list display in the display region 131a comprises the array numbers and the disc titles in characters in association with the six symbol marks displayed in the display region 131b.

The sequence of the numerical figures of the array numbers in the symbol marks in the display region 131b and the sequence of the array numbers in the display region 131a are "1", "2", . . . , "6" as seen from the bottom towards the top in correspondence with the array sequence of the optical discs arranged in the magazine 102.

The color display of the symbol marks SM in the display region 131b is made with variable colors for the respective genres or categories of the music recorded in the optical disc, such as jazz, fusion, rock or songs. The cursor D indicating the optical disc being reproduced is displayed at the title position registering with the optical disc being reproduced as a list, while the title is displayed by luminance inversion.

In this manner, different functions may be accorded to the display function in the display region 131b and in the display region 131a for realizing diversified functions of the display configuration.

Although the foregoing description has been made of the optical disc reproducing apparatus as the disc reproducing and/or apparatus for the disc-shaped recording medium, the present invention may also be applied to the optical disc recording apparatus.

What is claimed is:

1. A recording/reproducing apparatus for a disc-shaped recording medium, said recording medium having an information recording region for recording information signals and a table-of-contents region having recorded thereon at least number data and title data of the information signals recorded in said information recording region, comprising a recording/reproducing unit having loaded therein a plurality of disc-shaped recording media arranged co-planarly in a side-by-side relation, said unit recording the information signals on a selected one of said disc-shaped recording media and reproducing the information signals from the selected disc-shaped recording medium, and a display unit having a display operation thereof controlled by an output signal from said recording/reproducing unit, said display unit having a first display region for displaying the data recorded in said table-of contents region and a second display region having a display configuration corresponding to an arrangement of said plurality of disc-shaped recording media loaded in said recording/reproducing unit.

2. The apparatus as claimed in claim 1 further comprising detection means for detecting the presence or absence of each loaded disc-shaped recording medium, said display unit displaying an area in said second display region associated with a position of absence of said disc-shaped recording medium as indicated by a detection signal from said detection means in a manner which permits visual distinction from the remaining areas.

3. The apparatus as claimed in claim 1 further comprising a controller for controlling the display operation of said display unit based on an output signal of said recording and/or reproducing unit.

4. The apparatus as claimed in claim 3 wherein said second display region includes a plurality of display cells arrayed in correspondence with the arrangement of said disc-shaped recording media and wherein said display cells are illuminated by a control signal from said controller.

5. The apparatus as claimed in claim 4 wherein one of said plurality of display cells associated with the disc-shaped recording medium being recorded or reproduced by said recording/reproducing unit is controlled by said controller so as to be visually distinguishable from remaining ones of said plurality of display cells.

6. A recording/reproducing apparatus for a disc-shaped recording medium, said recording medium having an information recording region for recording information signals and a table-of-contents region having recorded thereon at least number data and title data of the information signals recorded in said information recording region, comprising a recording/reproducing unit having loaded therein a plurality of disc-shaped recording media arranged co-planarly in a side-by-side relation, said recording/reproducing unit recording the information signals on a selected one of said disc-shaped recording media and reproducing the information signals from the selected disc-shaped recording medium, a display unit having a display operation thereof controlled by an output signal from said recording/reproducing unit, said display unit having a first display region for displaying data recorded in said table-of contents region and a second display region having a display configuration corresponding to an arrangement of said plurality of disc-shaped recording media loaded in said recording/reproducing unit, and an input unit for inputting a signal for selecting one of the disc-shaped recording media loaded in said recording/reproducing unit, wherein a display is made in said first and second display regions based upon one of the output signal from said recording/reproducing unit and an output signal from said recording/reproducing unit following a selecting operation of said disc-shaped recording medium based upon an input signal by said input unit.

7. The apparatus as claimed in claim 6 further comprising a controller for controlling the display operation of said display unit based on an output signal of said recording and/or reproducing unit.

8. The apparatus as claimed in claim 7 further comprising detection means for detecting the presence or absence of each loaded disc-shaped recording medium, said display unit displaying an area in said second display region associated with a position of absence of said disc-shaped recording medium as indicated by a detection signal from said detection means in a manner which permits visual distinction from the remaining areas.

9. The apparatus as claimed in claim 7 wherein said second display region includes a plurality of display cells arrayed in correspondence with the arrangement of said disc-shaped recording media and wherein said display cells are illuminated in reference to a control signal from said controller.

10. The apparatus as claimed in claim 9 wherein one of the plurality of display cells associated with the disc-shaped recording medium being recorded or reproduced by said recording/reproducing unit is controlled by said controller so as to be visually distinguishable from remaining ones of said plurality of display cells.

11. The apparatus as claimed in claim 6 wherein said input unit includes a rotation unit for selecting one of said plurality of disc-shaped recording media.

12. The apparatus as claimed in claim 6 wherein said input unit is a remote controller for controlling the operation of the apparatus.

13. The apparatus as claimed in claim 11 wherein said controller controls said recording/reproducing unit so as to perform the selecting operation of said disc-shaped recording media based upon an input signal conforming to the rotational direction of said rotating unit.

14. An audio reproducing apparatus comprising a recording/reproducing device for a disc-shaped recording medium, said recording medium having an information recording region for recording information signals and a table-of contents region having recorded thereon at least number data and title data of the information signals recorded in said information recording region, said recording/reproducing unit comprising a recording/reproducing unit having loaded therein a plurality of said disc-shaped recording media arranged co-planarly in a side-by-side relation, said recording/reproducing unit recording the information signals on a selected one of said disc-shaped recording media and reproducing the information signals from the selected disc-shaped recording medium, and a display unit having a display operation thereof controlled by an output signal from said recording/reproducing unit, said display unit having a first display region for displaying data recorded in said table-of contents region and a second display region having a display configuration corresponding to the arrangement of said plurality of disc-shaped recording media, a plurality of speakers fed with an output signal of said recording/reproducing unit and outputting said output signal after conversion thereof into an audio output, and a sound field controller for matching the fixed position of a sound image corresponding to an audio output of said speakers to a selected audio sound hearing position, wherein the audio sound hearing position controlled by said sound field controller is displayed on said display unit using said second display region.

15. The audio reproducing apparatus as claimed in claim 14 further comprising a controller for controlling the display operation of said display unit based upon the output signal from said recording/reproducing unit and an output signal of said sound field controller.

16. The apparatus as claimed in claim 15 wherein said second display region includes a plurality of display cells arrayed in correspondence with the arrangement of said disc-shaped recording media and wherein said display cells are illuminated by a control signal from said controller.

17. The apparatus as claimed in claim 16 wherein the display cell associated with the disc-shaped recording medium being recorded or reproduced by said recording/reproducing unit is controlled by said controller so as to be distinguishable from the remaining display cells.

18. The apparatus as claimed in claim 16 wherein the display cell associated with the audio sound hearing position is controlled by said controller so as to be distinguishable from the remaining cells based upon an output signal from said sound field controller.

19. A recording/reproducing apparatus for a disc-shaped recording medium, said recording medium having an information recording region for recording information signals and a table-of-contents region having recorded thereon at least number data and title data of the information signals recorded in said information recording region, comprising a recording/reproducing unit having loaded therein a plurality of said disc-shaped recording media arranged co-planarly in a side-by-side relation, said recording/reproducing unit recording the information signals on a selected one of said disc-shaped recording media and reproducing the information signals from the selected disc-shaped recording medium, and a display unit having a display operation thereof controlled by an output signal from said recording/reproducing unit, said display unit having a first display region for displaying data recorded in said table-of-contents region and a second display region having a display configuration corresponding to the arrangement of said plurality of disc-shaped recording media, said first display region having a matrix display configuration corresponding to the display configuration in said second display region.

20. The apparatus as claimed in claim 19 further comprising detection means for detecting the presence or absence of each loaded disc-shaped recording medium, said display unit displaying an area in said second display region associated with a position of absence of said disc-shaped recording medium as indicated by a detection signal from said detection means in a manner which permits visual distinction from the remaining areas.

21. The apparatus as claimed in claim 19 further comprising a controller for controlling the display operation of said display unit based on an output signal of said recording/reproducing unit.

22. The apparatus as claimed in claim 21 wherein said second display region includes plural display cells in association with the arraying states of said disc-shaped recording media and wherein said display cells are illuminated under control by a control signal from said controller.

23. The apparatus as claimed in claim 21 wherein the display cell associated with the disc-shaped recording medium being recorded and reproduced by said recording/reproducing unit is controlled by said controller so as to be distinguishable from the remaining display cells.

24. The apparatus as claimed in claim 19 further comprising an input unit for inputting a signal for selecting a pre-set one of the disc-shaped recording media contained in said recording/reproducing unit.

25. The apparatus as claimed in claim 24 wherein said input unit includes a rotation unit for selecting said disc-shaped recording media.

26. The apparatus as claimed in claim 21 wherein said controller controls said recording/reproducing unit to perform the selecting operation of said disc-shaped recording media based upon an input signal conforming to the rotational direction of said rotating unit.

* * * * *

UNITED STATES PATENT AND TRADEMARK OFFICE
CERTIFICATE OF CORRECTION

PATENT NO. : 5,557,590
DATED : September 17, 1996
INVENTOR(S) : Shuichi Matsumoto, et al.

It is certified that error appears in the above-identified patent and that said Letters Patent is hereby corrected as shown below:

Col.2, line 48, after "M" insert --,--
      line 57, delete "in"
Col.3, line 10, after "selector" insert --,--
Col.7, line 52, change "16" to --15--
Col.8, line 24, after "result" insert --,--
      line 44, after "compartment" insert --,--
Col.9, line 25, after "set" insert --,--
      line 34, after "embodiment" insert --,--
Col.12, line 24, after "seat" insert --,--
      line 29, after "state" change ","to --.--
Col.16, line 42, change "SN" to --SM--
      line 44, after "102" change "," to --.--
      line 52, after "embodiment" insert --,--
Col.17, line 29, after "not" delete "-"
Col.20, line 43, after "produced" insert --by--
Col.23, line 67, after "embodiment" insert --,--

Signed and Sealed this

Sixth Day of October, 1998

*Attest:*

BRUCE LEHMAN

*Attesting Officer*     *Commissioner of Patents and Trademarks*